(12) United States Patent
Davis et al.

(10) Patent No.: US 10,423,708 B2
(45) Date of Patent: Sep. 24, 2019

(54) RDX ENHANCEMENT OF SYSTEM AND METHOD FOR IMPLEMENTING REUSABLE DATA MARKUP LANGUAGE (RDL)

(71) Applicant: e-Numerate Solutions, Inc., Great Falls, VA (US)

(72) Inventors: Russell T Davis, Bethesda, MD (US); Luther Pearson Hampton, Alexandria, VA (US)

(73) Assignee: e-Numerate Solutions, Inc., Great Falls, VA (US)

( * ) Notice: Subject to any disclaimer, the term of this patent is extended or adjusted under 35 U.S.C. 154(b) by 0 days.

(21) Appl. No.: 15/461,717

(22) Filed: Mar. 17, 2017

(65) Prior Publication Data

US 2017/0185572 A1    Jun. 29, 2017

Related U.S. Application Data

(63) Continuation of application No. 10/052,250, filed on Jan. 23, 2002, now Pat. No. 9,600,842.
(Continued)

(51) Int. Cl.
*G06F 17/21* (2006.01)
*G06F 17/22* (2006.01)
(Continued)

(52) U.S. Cl.
CPC ........ *G06F 17/2247* (2013.01); *G06F 3/0482* (2013.01); *G06F 3/04842* (2013.01);
(Continued)

(58) Field of Classification Search
CPC .. G06F 17/2247; G06F 17/218; G06F 17/272; G06F 17/30011; G06F 17/30014;
(Continued)

(56) References Cited

U.S. PATENT DOCUMENTS 6,134,563 A * 10/2000 Clancey ................ G06F 17/247
706/45
6,370,549 B1 * 4/2002 Saxton .............. G06F 17/30067
(Continued)

OTHER PUBLICATIONS

Hamscher et al., Extensible Business Reporting Language (XBRL) Specification, Jul. 31, 2000, XBRL.org, pp. 27 (Year: 2000).*
(Continued)

*Primary Examiner* — Chau T Nguyen

(57) ABSTRACT

Methods and systems in accordance with the present invention allow users to efficiently manipulate, analyze, and transmit eXtensible Business Reporting Language ("XBRL") reports. They allow users to automatically build financial reports that are acceptable to governing agencies such as the IRS. In one embodiment, the reports are developed by a parser that transforms text documents into software elements containing a format with a hierarchal relationship between the software elements, and an editor that develops reports by referencing the software elements transformed from the text documents. Methods and systems in accordance with the present invention also enable reports to be automatically scheduled by gathering desired information from an accounting system, formatting the information into an XBRL document, and transmitting it to an end source. Furthermore, systems and methods in accordance with the present invention allow a user to translate an XBRL document into RDL format and use the RDL system to manipulate and analyze it.

18 Claims, 19 Drawing Sheets

Related U.S. Application Data

(60) Provisional application No. 60/263,518, filed on Jan. 24, 2001.

(51) Int. Cl.
| | | |
|---|---|---|
| *G06F 17/24* | (2006.01) | |
| *G06F 17/27* | (2006.01) | |
| *G06F 16/80* | (2019.01) | |
| *G06F 16/93* | (2019.01) | |
| *G06F 16/955* | (2019.01) | |
| *G06F 3/0482* | (2013.01) | |
| *G06F 3/0484* | (2013.01) | |
| *G06F 3/0486* | (2013.01) | |
| *G06Q 40/00* | (2012.01) | |
| *G06Q 40/02* | (2012.01) | |

(52) U.S. Cl.
CPC .............. *G06F 16/80* (2019.01); *G06F 16/93* (2019.01); *G06F 16/94* (2019.01); *G06F 16/9558* (2019.01); *G06F 17/218* (2013.01); *G06F 17/272* (2013.01); *G06Q 40/02* (2013.01); *G06Q 40/12* (2013.12); *G06F 3/0486* (2013.01); *G06F 17/248* (2013.01); *G06F 17/2735* (2013.01)

(58) Field of Classification Search
CPC ............. G06F 17/30882; G06F 17/248; G06F 17/30908; G06F 3/0482; G06F 3/04842; G06F 17/2735; G06F 3/0486; G06F 16/80; G06F 16/93; G06F 16/94; G06F 16/9558; G06Q 40/02; G06Q 40/12
See application file for complete search history.

(56) References Cited

U.S. PATENT DOCUMENTS

| | | | |
|---|---|---|---|
| 6,847,960 B1 * | 1/2005 | Li | G06F 16/951 |
| 6,941,510 B1 * | 9/2005 | Ozzie | G06F 17/2205 |
| | | | 715/234 |
| 7,131,069 B1 * | 10/2006 | Rush | G06F 3/0482 |
| | | | 715/738 |
| 7,366,973 B2 * | 4/2008 | Sather | G06F 16/986 |
| | | | 715/234 |
| 2001/0014899 A1 * | 8/2001 | Fujikawa | G06F 17/2247 |
| | | | 715/234 |
| 2002/0052954 A1 * | 5/2002 | Polizzi | G06F 17/30873 |
| | | | 709/225 |

OTHER PUBLICATIONS

Hoffman et al., XBRL Taxonomy—Financial Reporting for Commercial and Industrial Companies, US GAAP, Jul. 31, 2000, XBRL.org, pp. 12 (Year: 2000).*

Gray et al., "Financial Reporting on the Internet—Instant, Economical, Global Communication", Jan. 2001, pp. 8 (Year: 2001).*

Glen L. Gray and Roger Debreceny, "Financial Reporting on the Internet—Instant, Economical, Global Communication", Singapore, Jan. 2001, pp. 8 (Year: 2001).*

* cited by examiner

Figure 14

Bank of America Corporation and Subsidiaries

Consolidated Balance Sheet

(Dollar Amounts In Thousands)

| | 2000 | 1999 |1508 |
|---|---|---|---|
| ASSETS | | | |
| Cash And Balances Due From Depository Institutions | 27,354,000 | 26,989,000 | |
| Interest Bearing Balances | 3,315,000 | 4,838,000 | |
| Federal Funds Sold And Securities Purchased Under Agreements To Resell | 18,134,000 | 37,923,000 | |
| Trading Assets | 44,381,000 | 38,450,000 | |
| Securities: | | | |
| Held To Maturity Securities Fair Value | 1,187,000 | 1,422,000 | |
| Available For Sale Securities Fair Value | 64,651,000 | 81,647,000 | |
| Total Securities | 46,992,000 | 83,069,000 | |
| Loans And Lease Financing Receivables | 365,799,000 | 363,834,000 | |
| Allowance For Loan And Lease Losses | 6,468,000 | -6,828,000 | |
| Total Loans And Leases Net Of Unearned Income | 392,192,000 | 370,862,000 | |
| Premises And Fixed Assets Including Capitalized Leases | 6,124,000 | 6,713,000 | |
| Customers Liability To This Bank On Acceptances Outstanding | 1,972,000 | 1,869,000 | |
| Accrued Interest Receivable | 4,432,000 | 3,777,000 | |
| Goodwill | 11,643,000 | 12,288,000 | |
| Other Intangible Assets | 1,899,000 | 1,730,000 | |
| Other Assets | 37,508,000 | 30,957,000 | |
| Total Assets | 642,191,000 | 632,574,000 | |
| LIABILITIES | | | |
| Deposits in domestic offices: | | | |
| Noninterest Bearing | 98,722,000 | 92,476,000 | |
| Interest Bearing Balances | 282,090,000 | 207,548,000 | |

Figure 15

RDX ENHANCEMENT OF SYSTEM AND METHOD FOR IMPLEMENTING REUSABLE DATA MARKUP LANGUAGE (RDL)

RELATED APPLICATIONS

This application is a continuation of U.S. patent application Ser. No. 10/052,250, filed Jan. 23, 2002, which, in turn, claims priority to U.S. Provisional Patent Application Ser. No. 60/263,518, filed on Jan. 24, 2001, which are all incorporated herein by reference.

The following identified U.S. patent applications are also relied upon and are incorporated by reference in this application.

U.S. patent application Ser. No. 09/573,778, entitled "Reusable Data Markup Language," and filed on May 18, 2000, now issued as U.S. Pat. No. 7,421,648.

U.S. patent application Ser. No. 09/573,780, entitled "Reusable Macro Markup Language," and filed on May 18, 2000, now issued as U.S. Pat. No. 7,650,355.

U.S. patent application Ser. No. 09/573,419, entitled "Tree View for Reusable Data Markup Language," and filed on May 18, 2000, now issued as U.S. Pat. No. 7,249,328.

U.S. patent application Ser. No. 09/573,413, entitled "Chart View for Reusable Data Markup Language," and filed on May 18, 2000, now issued as U.S. Pat. No. 6,920, 608.

U.S. patent application Ser. No. 09/784,205, entitled "RDL Search Engine," and filed on Feb. 16, 2001, now issued as U.S. Pat. No. 6,886,005.

U.S. Provisional Patent Application Ser. No. 60/135,525 entitled "Improved Spreadsheet Program With Improved Graphing Techniques and Internet Capabilities," and filed on May 21, 1999.

RELATED ART

Field of the Invention

The present invention relates to data processing systems, and more particularly to a computer markup language for financial accounting and a related data browser and manipulator.

Background

In today's world, increasing use of computers, computer applications and communication networks such as the Internet has created many different communication and data protocols. The variety of protocols and lack of standardization poses a significant problem for many industries, such as the financial industry. Conventionally, different companies, industries, and governments use different accounting systems and technological means for handling their financial information, and therefore cannot interact with each other efficiently. The lack of reporting standards and technological standards greatly impedes efficiency in communicating financial information, which, in turn, has led to the increasing desire for the development of technological standards for many industries and entities.

Currently on the Internet, transmissions and communications are commonly conducted using a communication protocol called the HyperText Transfer Protocol ("HTTP") which can be used to pass files and documents formatted in the HyperText Markup Language ("HTML"). A markup language is implemented by embedding markup "tags," special sequences of characters, that describe the structure as well as the behavior of a document and instruct a web browser or other program in the manner in which to display the document. Typically, documents or web pages formatted in HTML are simply ASCII text files that mix ordinary text with the markup tags.

However, the eXtensible Markup Language ("XML") is rapidly becoming the lingua franca for data exchange across the Internet. XML is a free-form markup language with unspecified tags, which allows developers to develop their tags and, in effect, create their own markup languages geared toward specialized tasks. In XML, the tags are organized according to certain rules, but their meaning is flexible. As such, different professions may develop their own specialized markup languages. For additional reference, XML is described in greater detail in "XML Bible," Elliotte Rusty Harold, IDG Books Worldwide, 1999, which is herein incorporated by reference.

The eXtensible Business Reporting Language ("XBRL"), a markup language which has an underlying syntax defined in XML, is the creation of an international XBRL project committee (XBRL.org) formed under the auspices of the American Institute of Certified Public Accountants ("AICPA"). In creating XBRL, the committee's goal was to develop a standard, computer-readable reporting language for financial information for businesses.

Generally, XBRL includes two major elements: (1) a "taxonomy," which defines the financial terms which can be reported and the interrelationships between these terms, and (2) an "instance document," which includes reported values for the terms of the taxonomy and references to the terms. An XBRL taxonomy is normally maintained by some controlling national authority such as the AICPA, which defines the actual accounting terms and their interrelationships in a jurisdiction. XBRL instance documents, on the other hand, are generally produced by business entities in a jurisdiction. Simply put, an instance document is a report from a financial institution, and the referenced taxonomy forms the context in which to read the report. For the purposes of this specification, the term "instance document" and "report" may be used interchangeably. A report is a further formatted instance document.

More specifically, XBRL taxonomies form the context for XBRL instance documents; that is, they define the names, data types (e.g., textual, monetary, numeric), and relationships (account/sub-account) that XBRL instance documents can reference. XBRL instance documents report values for elements (not necessarily all elements) defined in a taxonomy. The XBRL instance document is responsible for providing information about quantitative values such as the currency (monetary types), precision (e.g., values reported + or −10%), and magnitude (e.g., numbers in thousands, millions, etc.).

Table 1 below shows a sample XBRL document fragment from a taxonomy, and Table 2 shows an instance document fragment referencing the terms of the taxonomy. An excerpt from an exemplary taxonomy document may be seen at Appendix A, while a full instance document may be seen at Appendix B.

TABLE 1

Fragment of Taxonomy Document

```
name="ci:cashCashEquivalentsAndShortTermInvestments.cashAndCashEquivalents"
type="xbrl:monetary">
     <annotation>
        <appinfo>
          <xbrl:rollup
to="ci:currentAssets.cashCashEquivalentsAndShortTermInvestments" weight="1"
order="1" />
        <xbrl:label xml:lang="en">Cash and Cash
Equivalents</xbrl:label>
          </appinfo>
       </annotation>
    </element>
    <element name="ci:cashAndCashEquivalents.cashEquivalents"
type="xbrl:monetary">
       <annotation>
         <appinfo>
           <xbrl:rollup
to="ci:cashCashEquivalentsAndShortTermInvestments.cashAndCashEquivalents"
weight="1" order="1" />
         <xbrl:label xml:lang="en">CashEquivalents</xbrl:label>
          </appinfo>
       </annotation>
    </element>
    <element name="ci:cashAndCashEquivalents.cash" type="xbrl:monetary">
       <annotation>
         <appinfo>
           <xbrl:rollup
to="ci:cashCashEquivalentsAndShortTermInvestments.cashAndCashEquivalents"
weight="1" order="2" />
         <xbrl:label xml:lang="en">Cash</xbrl:label>
          </appinfo>
       </annotation>
    </element>
    <element
```

TABLE 2

Fragment of Instance Document

```
<?xml version="1.0"?>
<!-- Created by XBRL Solutions, Inc. XBRLDOM -->
{Group #1}
<group
     xmlns="http://www.xbrl.org/core/2000-07-31/instance"
     xmlns:ci="http://www.xbrl.org/us/gaap/ci/2000-07-31"
xmlns:air="http://www.xbrlSolutions.com/Public/Demos/EdgarOnline/Repository/
Taxonomies/air"
xmlns:aag="http://www.xbrlSolutions.com/Public/Demos/EdgarOnline/Repository/
XBRL/Airlines/AlaskaAirGroup/AlaskaAirGroup"
schemaLocation="http://www.xbrlSolutions.com/Public/Demos/EdgarOnline/Repository/
XBRL/Airlines/AlaskaAirGroup/AlaskaAirGroup c:/Schema/AlaskaAirGroup.xsd"
     id =""
     type="ci:statements"
     entity="Alaska Air Group, Inc."
     unit="ISO4217:USD"
     scaleFactor="6"
     precision="10"
     decimalPattern="#.#"
     formatName=""
>
{Group #2}
<group type='ci:statements.balanceSheet'>
    <group
{Group #3}
type="'ci:cashCashEquivalentsAndShortTermInvestments.cashAndCashEquivalents'>
        <label href='xpointer(..)' xml:lang='en'>Cash and cash equivalents</label>
        <item period='1998-12-31'>29.4</item>
        <item period='1999-12-31'>132.5</item>
    </group>
    <group type='ci:shortTermInvestments.marketableSecurities'>
        <label href='xpointer(..)' xml:lang='en'>Marketable securities</label>
        <item period='1998-12-31'>277.2</item>
        <item period='1999-12-31'>196.5</item>
    </group>
```

The following is a brief explanation of the contents of the instance document fragment and the interrelation between the taxonomy and instance document fragments of Tables 1 and 2. In the instance document fragment, the "xmlns" lines and the schema line of the first group may be ignored. For the purposes of this explanation, the groups are identified by bracketed comments including the group number. The balance of the elements in the first group define default reporting parameters. Parameters for an entry (indicated by an item tag) are determined by examining the entry and its containing groups, inward to outward. The first value found for a parameter is the value for that item.

Furthermore, the first group encompasses all others, so it defines the defaults. In particular, the defaults for the above instance document fragment are id (" "), entry type ("statements"), reporting entity ("Alaska Air Group, Inc."), currency type used (US $), scale factor (all values in millions), significant digits in numbers (10), decimal patter (standard US with commas and decimal point at cents), and format (" "). In the above defaults, the empty brackets (" ") indicate that there is no entry.

The second group tag establishes a report segment, in this instance a balance sheet. The third group tag specifies that the items it contains report on taxonomy item "cash-CashEquivalentsAndShortTermInvestments.cashAnd-CashEquivalents." The elements of this taxonomy item are identified in the taxonomy document fragment provided above in Table 1. By calling the taxonomy item from within the instance document, the values from the instance document are assigned to the elements of the taxonomy document.

Within the third group, the "label" tag specifies that a new label is being provided to override a label in the taxonomy document. The "lang" tag indicates that an english language label is being overridden. The new label (cash and cash equivalents) follows the "lang" tag definition. The next two items identified by "item period" provide reports for the periods ending Dec. 31, 1998 and Dec. 31, 1999. Using the defaults from the first group tag, these items indicate that Air Alaska's cashAndCashEquivalents were US$29.4 Million in 1998 and US$132.5 Million in 1999. A similar report would follow for shortTermInvestments.marketableSecurities, which is the next call within the balance sheet report segment. This, again, is a call relating to the elements of an item within the taxonomy document. The elements of this taxonomy item are not shown in the above taxonomy document fragment.

In addition to defining a taxonomy, XBRL also provides a mechanism whereby taxonomies can be extended to include company-specific accounting practices by adding new elements (e.g., for a baseball team, ground keeping expense may be added to the taxonomy). Thus, a company can maintain an internal accounting structure at any level of sophistication. XBRL takes advantage of the fact that approved accounting systems roll up to the elements defined in a jurisdiction's Generally Accepted Accounting Practices ("GAAP"). This means that all companies in a jurisdiction can report (at some perhaps aggregated level) with reference to the GAAP-based taxonomy. This permits true "apples-to-apples" comparison of a company's financial data without placing new requirements on the company's internal accounting practices. In keeping with this methodology, XBRL.org has published, in association with the AICPA, a "standard" taxonomy based on U.S. GAAP. XBRL.org is also currently working with the U.S. Federal Government to publish a standard U.S. Government Taxonomy and with the International Accounting Standards Committee ("IASC") to publish an international taxonomy which can serve as a basis for each member state's GAAP taxonomy. This taxonomy is described in greater detail in "XBRL Essentials," Charles Hoffman, Carolyn Strand, American Institute of Certified Public Accountants, Inc., 2001, which is herein incorporated by reference.

XBRL is an XML-based language used for reporting financials such as balance sheets, cash flow reports, and the basic information that is reported to the Securities and Exchange Commission ("SEC"). Conventionally, users (1) manually compose files to be submitted to the SEC or (2) pay someone to put the files in computer-readable form. XBRL, however, provides a computer-readable format for companies to report their financials to the SEC on Electronic Data Gathering Analysis and Retrieval System ("EDGAR") forms. EDGAR is the SEC database where companies report their financial performance to the SEC.

Although XBRL is well-defined, tools are not available for users to build XBRL reports. Currently, users may not automatically build financial reports and SEC filings that are acceptable to the Internal Revenue Service ("IRS"). Conventional systems also do not enable reports to be automatically scheduled and transmitted in XBRL format. Furthermore, users cannot automatically link a current accounting system to an XBRL document to generate an XBRL report. They also do not have an efficient and automatic means to analyze and manipulate data in an XBRL document. It is therefore desirable to overcome the aforementioned problems and other related problems.

SUMMARY

Methods and systems consistent with the present invention provide a data processing system for developing reports comprising: a parser that receives one or more text documents and creates software elements having a format with a hierarchal relationship between the software elements based on the one or more text documents; and an editor that develops reports by referencing the software elements created from the text documents and retrieving data from one or more sources to represent one or more values within the report. In one implementation, the format with the hierarchal relationship between the software elements is the Numerator Document Object Model ("NDOM"), which is developed by interpreting tags included in the text document.

In accordance with the present invention, the editor enables the modification of the software elements to create a new combination of software elements representative of a new text document. In one implementation, the editor also enables the editing of the parameters associated with the software elements.

Furthermore, in another implementation, methods and systems consistent with the present invention provide a manager, which manipulates the software elements and enables browsing, editing, loading, and storing of the software elements. Also, the systems and methods consistent with the present invention provide a mapper for generating a relationship between data from one or more sources and the one or more values to be placed within the report. The mapper working in conjunction with a report template generates the report. The template contains data that is directly inserted into the report and instructions to enable the mapper to retrieve data from the one or more sources for insertion into the report.

Further, in yet another implementation, methods and system consistent with the present invention provide a means for transforming the software elements to new software elements and importing the new software elements into the RDL system. The software elements are transformed to the new software elements by retrieving a tag associated with each of the software elements in a dictionary and invoking a translation routine associated with the tag.

BRIEF DESCRIPTION OF THE DRAWINGS

FIG. 14 is a screen shot of an example of an unformatted XBRL instance document or report;

FIG. 15 is a screen shot of an example of a formatted XBRL instance document or report;

DETAILED DESCRIPTION

Introduction

Figure 1:
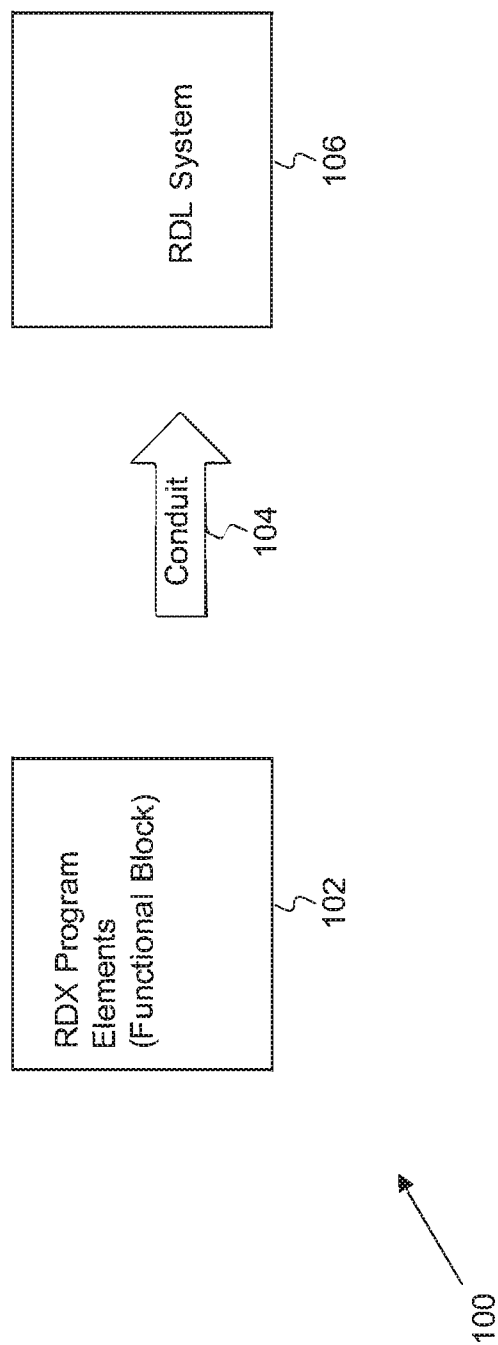
FIG. 1 illustrates a high level diagram of an RDX system for processing XBRL documents, and an RDL system in accordance with the present invention.

Methods and systems in accordance with the present invention allow users to efficiently build, manipulate, analyze and transmit XBRL documents and reports. They allow users to automatically build financial reports, such as SEC filings, that are acceptable to governing agencies such as the IRS. Methods and systems in accordance with the present invention also enable reports to be automatically scheduled, in one implementation, by gathering desired information from an accounting system, formatting the information into an XBRL document, and transmitting it to an end source. Therefore, these systems may automatically link a current accounting system with an XBRL instance document to generate a report. Furthermore, systems in accordance with the present invention allow a user to translate an XBRL instance document into RDML format and use the RDML system to manipulate and analyze it.

RDML is referred to as the Reusable Data Markup Language ("RDML") in U.S. patent application Ser. No. 09/573,778, which provides a detailed explanation of RDML systems and methods and was previously incorporated herein. For the purpose of this description hereinafter RDML will be referred to as RDL.

One of the advantages of the systems and methods in accordance with the present invention is the functionality to hide the technical complexities of XBRL schema and instance document creation. For example, XBRL taxonomy creation, which is typically a complex process resulting in the creation of an XML document with a very explicit, highly technical format, is experienced by the user as the creation of a simple set of definitions grouped by subject. Similarly, the creation of the XBRL instance document, another complex XML structure with complex ties to a specific XBRL taxonomy document, is experienced by the user as a simple "drag and drop" process, where taxonomy elements for reporting are selected by mouse click and subsequently "dropped" into the target document. A similar "drag and drop" process enables a technically unsophisticated user to define for the program how data should be located in the user's database, and be translated and inserted into an XBRL instance document. The RDX system maintains the results of these processes for later reuse, which reduces the time the user must spend preparing reports by allowing the user to specify templates corresponding to report types that may be reused at each reporting interval.

In addition to simplifying a complex technical procedure for use by financial personnel minimally skilled in XBRL, the systems and methods of some implementations of the present invention may provide many other technical innovations such as:

i) the use of XML files to save the results of the user's document definitions in a reusable fashion;

ii) the use of Open Database Connectivity ("ODBC") which allows the system to capture and report information from many commercial database management system products as well as many spreadsheet products such as Microsoft Excel;

iii) the use of the computer's real time clock to schedule automatic document preparation and publishing at user-defined intervals; and iv) the automatic conversion of XBRL documents into the RDL language for analysis.

Methods and systems in accordance with the present invention may also aid an XBRL user in at least two ways: XBRL document development and XBRL document analysis. In accordance with the present invention, XBRL document development is simplified by the Numerator Document Object Model ("NDOM"), discussed below, which provides a standard document object which can be easily managed, manipulated, edited and stored using variants on tools developed to manage Reusable Data Markup Language ("RDL") objects. In one implementation, document templates in accordance with the present invention make regular financial reporting a "one-click" process, since they provide for the specification within the document of the location of all the data elements in advance and the ability to actually create the document later, perhaps, at timed intervals.

It may be appreciated by one skilled in the art that other text documents may be input and manipulated by systems and methods in accordance with the present invention to develop instance documents and reports. For example, other text documents such as Electronic Business XML ("ebXML"), RDL, and XML may be manipulated to create instance documents and reports that may also be in other formats other than XBRL.

With respect to document analysis, methods and systems in accordance with the present invention provide extended analysis of XBRL data by providing a conduit into the RDL system, which is described in greater detail in U.S. patent application Ser. No. 09/573,778 entitled "Reusable Data Markup Language," and filed on May 18, 2000, and which was previously incorporated by reference. The RDL system itself permits the efficient browsing and manipulation of numerical data and extends the numerical data by utilizing an XML-based format. Existing data, including XBRL data, can be converted to RDL format and used with an RDL browser to perform data analysis, viewing, and management. In addition, using RDL-based data, comparisons with information from other sources, not just XBRL sources, become possible with a click of the mouse, for example. This process opens analysis possibilities that would normally remain closed to XBRL users.

It may also be appreciated by one skilled in the art that other text documents may be manipulated and converted, in accordance with the systems and methods of the present invention, into RDL format for data analysis.

System Overview

FIG. 1 illustrates that, in one implementation, in accordance with the present invention, a system, referred to as an "RDX" system, is a "bolt-on" or expansion to the system and methods for implementing RDL. RDX system 100 can be viewed as two independent functional components connected by a conduit 104, as shown in FIG. 1. The first functional component comprises the RDX program elements (functional block) 102; and, the second functional component is RDL system 106, which provides the analytical processing capability of the system. RDX program elements 102 convert XBRL information into RDL data objects for analysis by RDL system 106. Conduit 104 is a mechanism whereby RDL data objects are passed to the RDL system 106. Conduit 104 may include any communications mechanism (e.g., an internal memory copy, a TCP/IP transfer across the Internet, or a fetch from a storage device such as a hard disk).

In accordance with embodiments consistent with the present invention, RDX system 100 is designed to speed up and simplify the creation of XBRL taxonomies, instance documents, and reports, and to bring the analysis and data management capabilities of RDL system 106 to the information contained in these documents.

Figure 2:
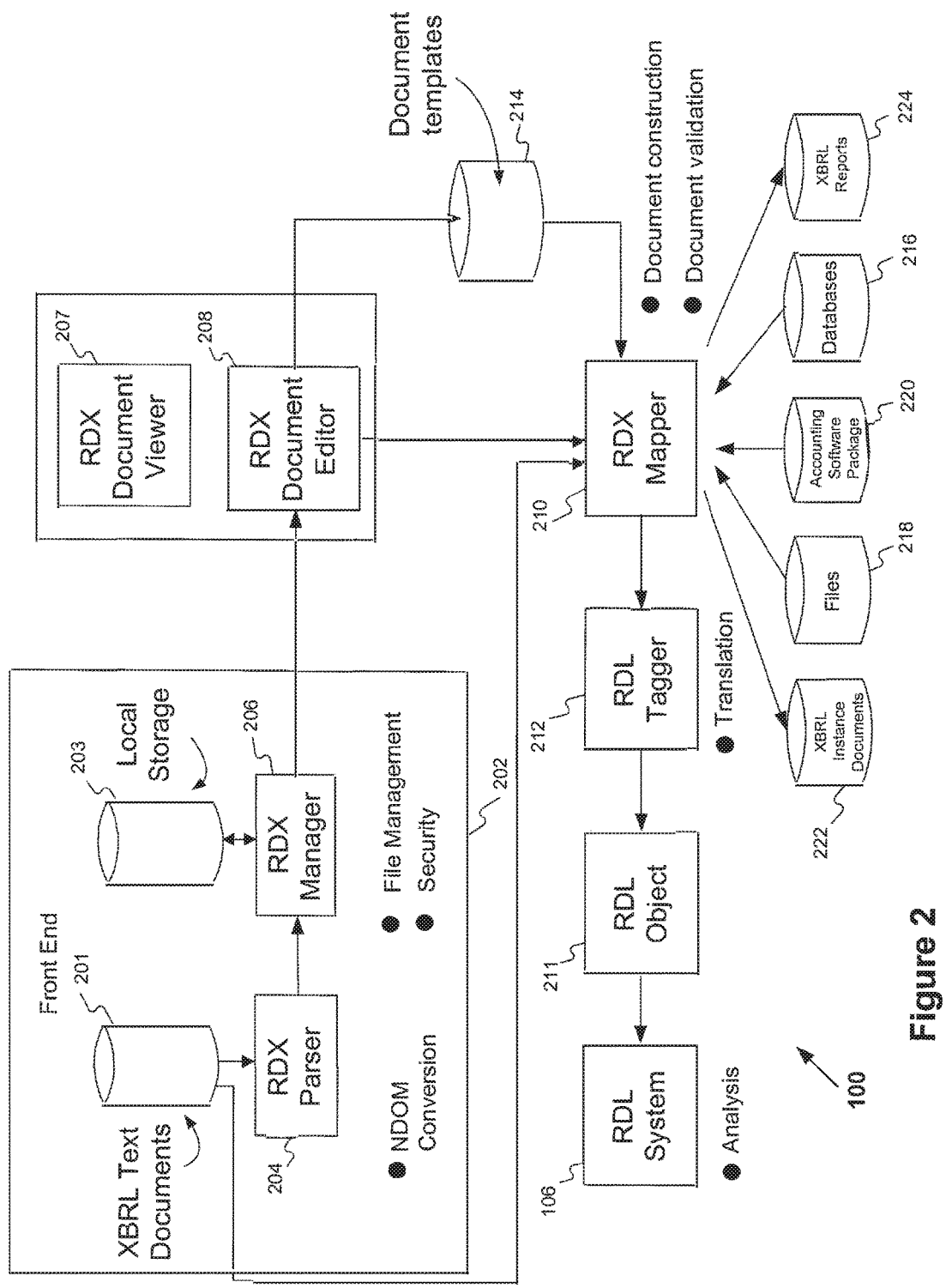
FIG. 2 depicts a diagram of a system for creating, manipulating, analyzing and transmitting XBRL documents in accordance with the present invention.

FIG. 2 illustrates a diagram of a system for creating, manipulating, analyzing, and transmitting XBRL documents in accordance with the present invention. In one implementation, RDX system 100 comprises several parts: (1) the RDX front end 202 (which includes the RDX parser 204 and RDX manager 206), (2) the RDX document editor 208, (3) the RDX mapper 210, (4) the RDL tagger 212, and (5) RDL system 106.

RDX parser 204 accepts documents such as ASCII text documents containing XBRL tags and transforms them into internal RDX documents or NDOMs. NDOMs are software elements of a standard format corresponding to the sections of the XBRL taxonomy document. The NDOMs form a tree structure corresponding to a structure described in the XBRL taxonomy document. In other words, the NDOMs as a group are software representations of an XBRL taxonomy document in a standard format After RDX parser 204 translates the text documents, creates the NDOMs and links them in a structure analogous to the input taxonomy document, the NDOMs can be used by RDX manager 206. RDX manager 206 provides XBRL-specific capabilities such as the browsing, editing, loading, and storing of NDOMs. In addition, RDX manager 206 provides capabilities for the creation of new NDOMs and the restructuring of both new and previously created NDOMs into software structures corresponding to new XBRL taxonomy documents. RDX manager 206 also contains specific capabilities for the management of new XBRL taxonomy and instance documents, which are created from the NDOMs and may be stored and retrieved from local storage 203.

RDX document editor 208 is used to define document templates 214, which the system may use to create XBRL instance documents 222. Document templates 214 contain two types of information: (1) data to be directly inserted into XBRL instance documents 222; and (2) instructions enabling XBRL instance document 222 data to be inserted at the time of document creation from the user's accounting and computer systems. The user may use RDX document editor 208 to manually input data of type (1) into the document template 214 in a manner similar to a word processor.

Document templates 214 produced by these operations provide instruction for RDX mapper 210 to draw data both internally and from local or remote sources such as databases 216, files 218, and accounting software package 220 to create XBRL instance document 222. Document templates 214 may also be used for generating deferred XBRL reports 224.

RDX mapper 210 creates and links the NDOMs to form a software representation of an XBRL document that will be used to build the actual XBRL instance documents 222 and XBRL reports 224. XBRL reports 224 are XBRL instance documents that have been formatted into a user friendly report. RDX mapper 210 may be used to build a report upon request or at a user specified time. In one implementation, RDX mapper 210 is a translation mechanism for acquiring data from an accounting system (e.g., an accounting database or files) and placing the data in the appropriate location within XBRL report 224, as instructed by one or more document templates 214. Once RDX mapper 210 has processed document templates 214, which defines the data for XBRL report 224, RDX mapper 210 may be instructed to immediately execute or to schedule execution of XBRL report 224 at a later time. In the first case, a report reflecting the information immediately available is produced. In the second, the report will contain information available at the time of its scheduled execution.

RDX mapper 210 also provides a facility whereby potential XBRL instance documents 222 elements are displayed on the right side of the computer screen and potential sources for this data from local or remote computer systems, for example, are displayed on the left side. The user indicates that an instance document element should be included in the XBRL instance document 222 under construction by "dragging" it from the right side with the computer's mouse. The user indicates where the information for this element can be found in the computer database by "dropping" the dragged element on a data element on the left side of the computer screen. This process will be illustrated below in the description of FIG. 16.

RDL tagger 212 supports translation of XBRL instance document data into RDL format for analysis in RDL system 106. The RDL system, in turn, provides data browsing, data manipulation, data viewing (for example, in the form of charts, spreadsheets, etc.), and a general user interface for RDL documents.

System Hardware Components

Figure 3:
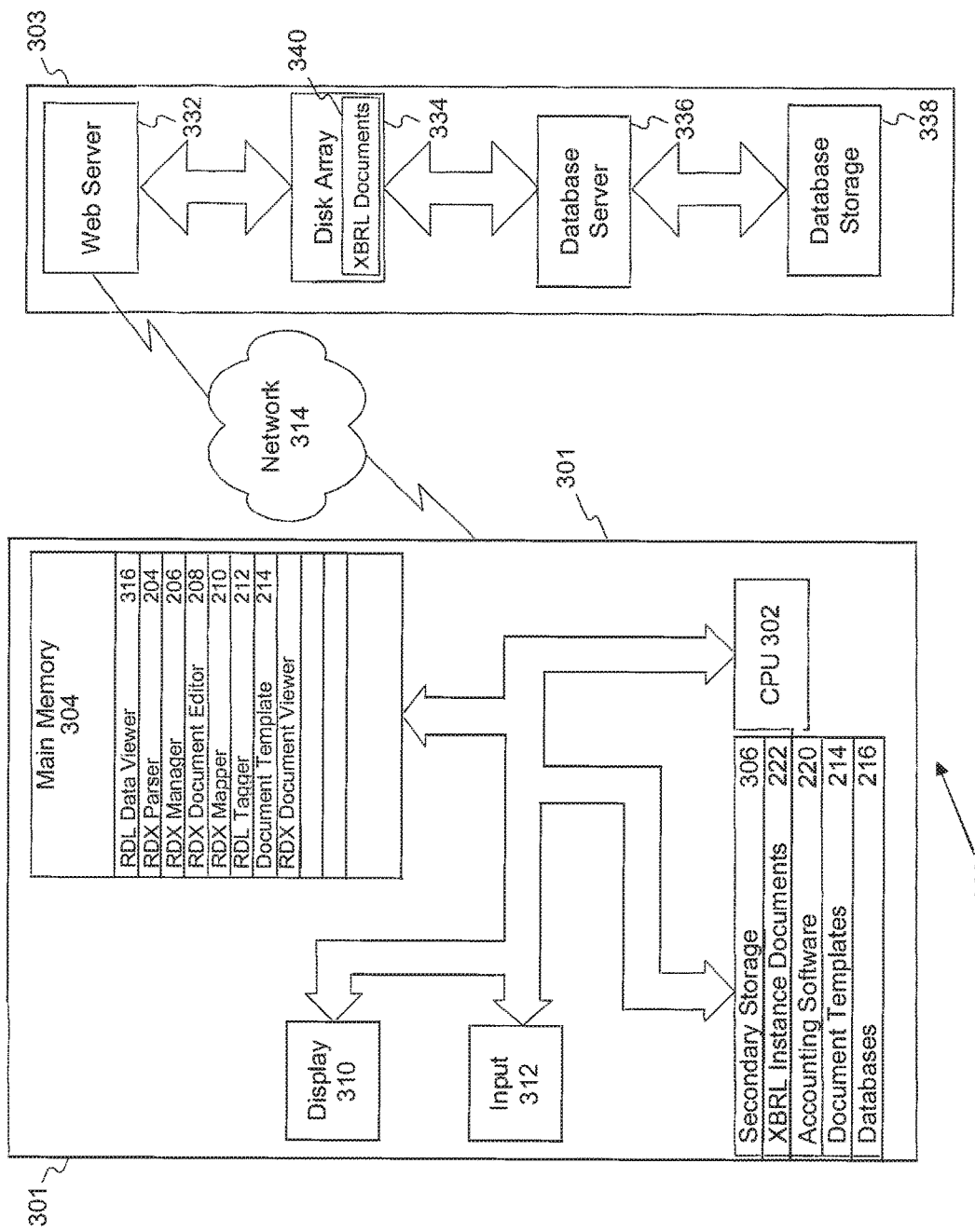
FIG. 3 shows an exemplary data processing system suitable for use with methods and systems in accordance with the present invention.

FIG. 3 depicts a data processing system 300 that is suitable for use with methods and systems consistent with the present invention. Data processing system 300 comprises a computer 301 and a server computer 303 interconnected via a network 314, such as the Internet, where server computer 303 may provide XBRL documents to computer 301. However, computer 301 may also retrieve XBRL taxonomy documents from, for example, a local storage disk or its memory. Computer 301 includes a central processing unit (CPU) 302, a main memory 304, a secondary storage device 306, a display 310, and an input device 312.

Main memory 304 may include the RDL data viewer 316, which may be a personal computer-based program. Although located in main memory 304, one skilled in the art will appreciated that data viewer 316 may reside elsewhere. Data viewer 316 may be used to convert XBRL documents to RDL documents, for use in RDL system 106 (FIG. 1), or RDL data viewer 316 may be used to create XBRL reports from the XBRL taxonomy documents. In addition to data viewer 316, main memory 304 includes RDX-related software components that may be used to input and manipulate XBRL taxonomy documents, such as the RDX parser 204, RDX manager 206, RDX document editor 208, RDX mapper 210, RDL tagger 212, and document templates 214. Each of these components and their interactions are described below in greater detail.

The various software components of RDX system 100 and related software components, which are located in main memory 304, may be programmed in object-oriented languages such as the Java™ programming language. The Java™ programming language is described in further detail in "The Java Programming Language," $2^{nd}$ Ed., Ken Arnold, James Gosling, Addison-Wesley, 1998, which is incorporated herein by reference. For further description of the Java Language, reference should be made to "The Java Language Specification," James Gosling, Bill Joy, Guy Steele, Addison-Wesley, 1996, which is also incorporated herein by reference. However, one skilled in the art will appreciate that other programming languages may be used.

Secondary storage 306 may include XBRL instance documents 222. It may also include financial or accounting software 220 from which information may be extracted to create XBRL instance documents 222 using, for example, document templates 214 (discussed below). Secondary storage 306 may also store database 216, which maintains original data, for creating XBRL documents 220. As an alternative, these components may also be stored in main memory 304 or in another remote computer (not shown).

FIG. 3 also depicts a web server 332 on computer 303 that interacts with computer 301 via network 314. In one system consistent with the present invention, web server 332 transmits XBRL instance documents 222 over network 314, and may be connected to a disk array 334, which holds XBRL instance documents 222. Disk array 334 may receive data documents from database server 336, which may receive data from database storage 338. Protocols used in the transmission of information between web server 332 and computer 301 include, but are not limited to HTTP and File Transfer Protocol ("FTP").

One skilled in the art will appreciate that aspects of methods and systems consistent with the present invention may be stored on or read from other computer readable media besides memory like secondary devices, such as hard disks, floppy disks, and CD ROM, or a carrier wave from a network (such as the Internet). Additionally, one skilled in the art will also appreciate that the data processing system may contain additional or different components, or one or more components may be combined into one software module providing multiple functions.

NDOM Development

XML is normally written to describe a particular document. XML has an ability to describe structures. Normally, an XML parser (not shown) creates a Document Object Model ("DOM") for one document, but XBRL parser 204, however, can create an NDOM, which includes many different documents. The NDOM created by the XBRL parser 204 is non-XML. The NDOM is a software object or representation of the one or more documents described by the XML. One major difference between a normal XML parser and RDX parser 204 is that RDX parser 204 understands that the XBRL document is actually a collection of documents. In an XBRL file, there is a DOM that may actually contain three or four sub-Document Object Model files, a modification to the XML view that a document comprises exactly one DOM.

Figure 4:
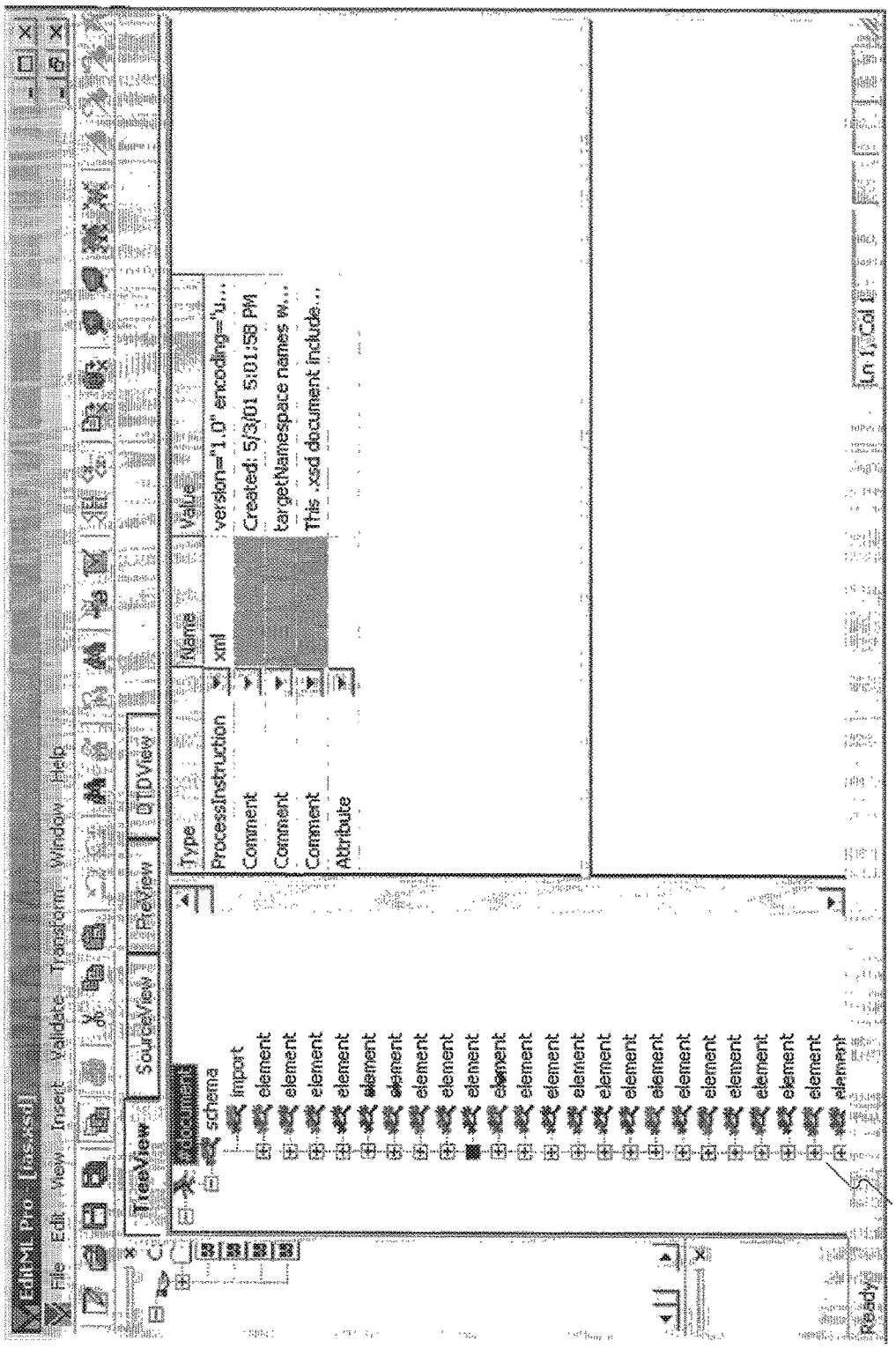
FIG. 4 is a screen shot of an example of a result of executing an XML parser on an XBRL taxonomy document.
Figure 5:
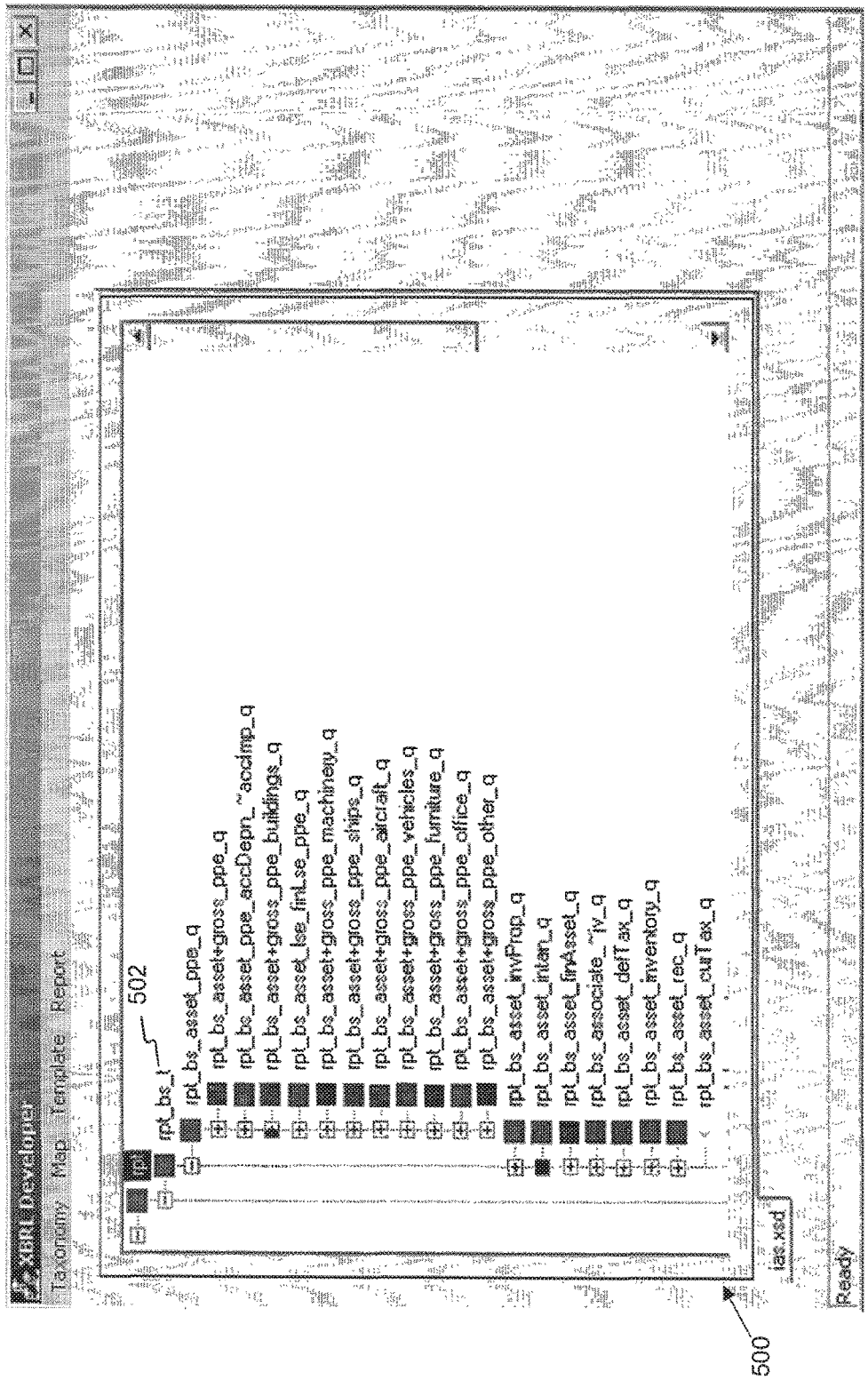
FIG. 5 is a screen shot of an example of a result of executing the RDX parser on an XBRL taxonomy document.

FIGS. 4 and 5 illustrate the operation of an XML parser and RDX parser 204. An XML parser does not understand that there can be multiple documents in an XBRL taxonomy document; it simply interprets the XML. If a user runs an XML parser on an XBRL taxonomy document, such as the document in Appendix A, the result is a set of lines of text with no structure. These lines of text may be represented as illustrated in window 402 of FIG. 4. As shown in window 402, the result of the XML parser is a set of elements with no hierarchy. The XBRL taxonomy document contains information not interpretable to the XML parser describing the parent-child relationships between the entities. Because the XML parser is unable to interpret the relationships between the entities, it is unable to discern that there are multiple document structures in the XBRL taxonomy document. XML parsers are designed to read, but not necessarily interpret, valid XML; therefore, anything within the XBRL taxonomy document that is not understandable from normal XML format is ignored or may raise an error message.

In other words, the lines of text in the XBRL taxonomy document that the XML parser is unable to interpret are the instructions for building the document structure. The XML parser, however, is able to accept a listing of the document structure, but not interpret the instructions for building the document structure. One of the advantages of RDX parser 204 is that it is able to take a very complex list of instructions for building the document structure and represent them in very simple line item connections. Therefore, a user can utilize the line item connections to understanding the complex list of instructions, without expending the effort to read and study the list. RDX Parser 204 decodes the instructions in the XBRL document to create a user friendly representation of the instructions (i.e., the NDOM structure) from which the user can develop financial reports. FIG. 5 illustrates an exemplary representation of an NDOM structure of an XBRL taxonomy document created by the RDX parser 204. The software elements, for example element 502, in screen shot 500 represent the corresponding elements of the XBRL taxonomy document.

As part of front end 202, RDX parser 204 initially accepts XBRL text documents 201 in the standard form and automatically converts them to the internal NDOM format so that they may be created, managed and edited in a more efficient, computer-friendly format than using XBRL text document 201. RDX parser 204 uses an internal Finite State Machine ("FSM") to determine the structure of the underlying XBRL document from information generated by an off-the-shelf XML parser (e.g., the MSXMLU parser available from Microsoft Corp.) As was noted earlier, the XML parser can only detect the structure of the document itself, not the structure that the document describes. Each time that the XML parser detects an XML element in the document, the FSM is invoked. The FSM, based on its current state and the input element, builds the appropriate NDOM element. This process continues until the XML parser has processed the entire document. At this point, the FSM makes a final pass through the information contained in the NDOM, and a complete document object is available for processing. In the final pass, the FSM validates and error checks the NDOM using XBRL text document 201.

Figure 6A:
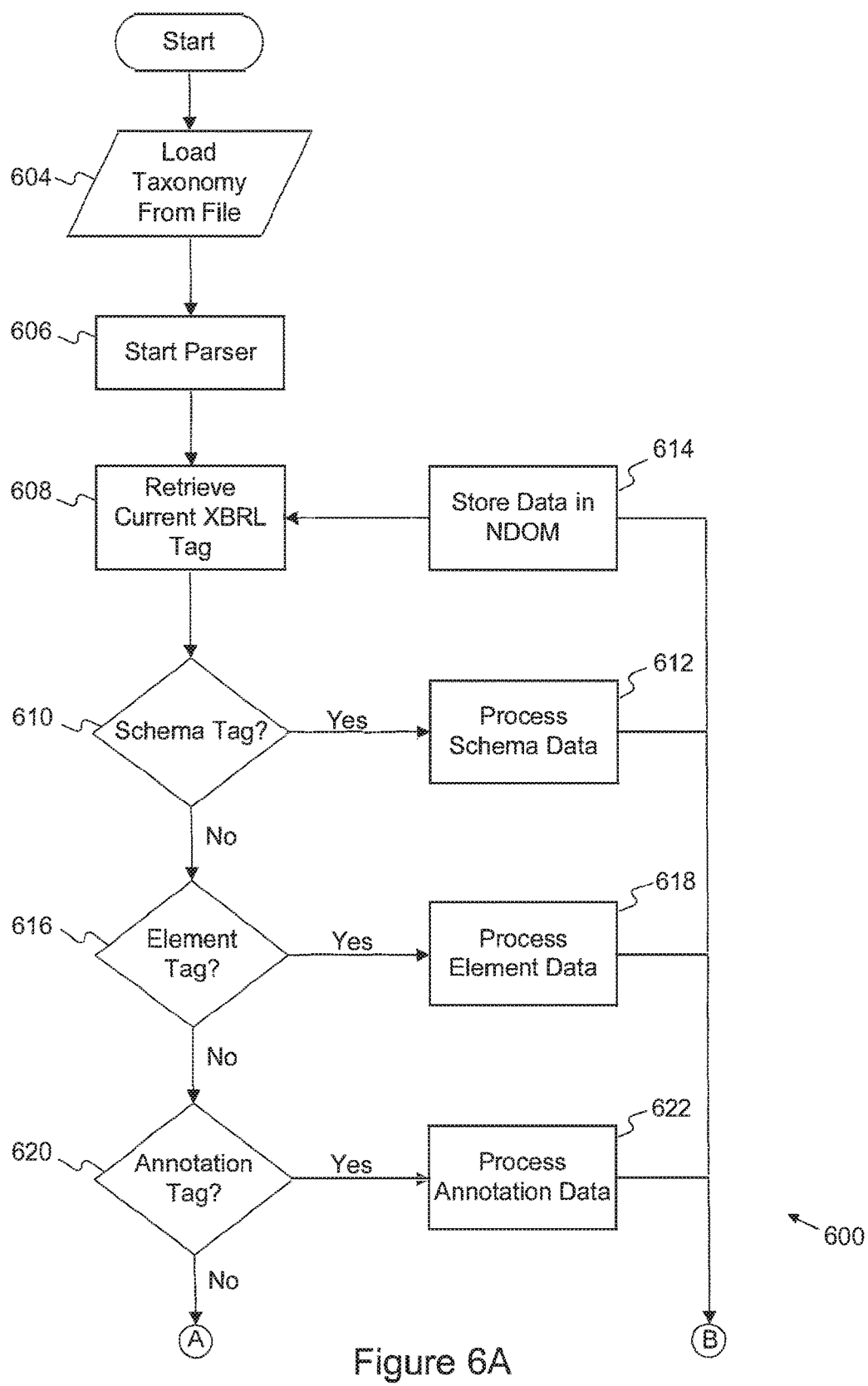
FIGS. 6A and 6B are flowcharts of an exemplary process by which an NDOM is developed from an XBRL taxonomy document.
Figure 6B:
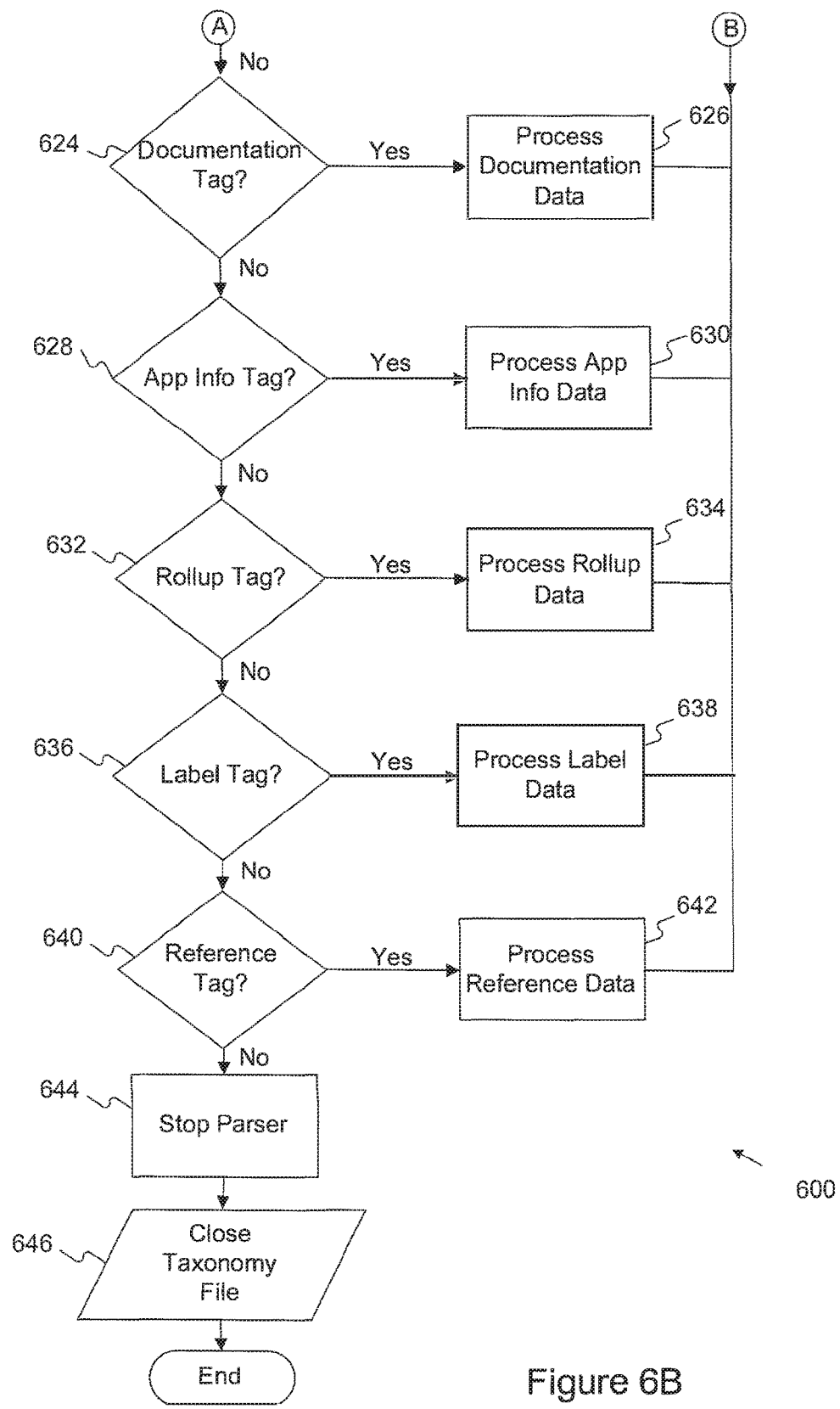

FIGS. 6A and 6B illustrate an exemplary process for developing an NDOM in further detail. The process illustrated in FIG. 6A starts by loading the taxonomy document (step 604). Once the taxonomy document is loaded, the parser starts (step 606) and retrieves the current XBRL tag (step 608). Process 600 then determines the type of XBRL tag it is processing. If it is a schema tag, the schema data is processed (step 612) and stored in NDOM (step 614) as a software element with the appropriate hierarchy in the NDOM.

Typically, a schema tag is the first tag to be processed by interpreting the element data and determining the location where the element data from the source (i.e, the storage location of the taxonomy document) is to be copied into a target data structure (i.e, the NDOM). Using this process, the hierarchy (the parent-child relationships between the software elements) within the taxonomy document is created within the NDOM. The other tags, which are processed in the order of appearance within the taxonomy document and are discussed below, are processed in a fashion similar to the processing of the schema tag.

Process 600 then retrieves the current XBRL tag and begins the tag determination process again (step 608). If it is determined that the XBRL tag is not a schema tag, process 600 proceeds to step 616 and determines whether the XBRL tag is an element tag. If it is an element tag, the element data is processed (step 618) and stored in the NDOM (step 614) as a software element with the appropriate hierarchy in the NDOM. Process 600 then retrieves the current XBRL tag and begins the tag determination process again (step 608). If the XBRL tag is not an element tag, process 600 proceeds at step 620 and determines if the XBRL tag is an annotation tag. If it is an annotation tag, the annotation data is processed (step 622) and the data is stored in the NDOM (step 614) as a software element with the appropriate hierarchy in the NDOM.

Referring now to FIG. 6B, process 600 then retrieves the current XBRL tag and begins the tag determination process again (step 608). If it is determined that the XBRL tag is not an annotation tag, process 600 proceeds to step 624 and determines whether the XBRL tag is a documentation tag. If it is a documentation tag, the documentation data is processed (step 626) and stored in the NDOM (step 614) as a software element with the appropriate hierarchy in the NDOM. Process 600 then retrieves the current XBRL tag and begins the tag determination process again (step 608). If the XBRL tag is not a documentation tag, process 600 proceeds to step 628 and determines if the XBRL tag is an appinfo tag. If it is an appinfo tag, the appinfo data is processed (step 630) and the data is stored in the NDOM (step 614) as a software element with the appropriate hierarchy in the NDOM. Process 600 then retrieves the current XBRL tag and begins the tag determination process again (step 608).

If it is determined that the XBRL tag is not an appinfo tag, process 600 proceeds to step 632 and determines whether the XBRL tag is a rollup tag. If it is a rollup tag, the rollup tag data is processed (step 634) and stored in the NDOM (step 614) as a software element with the appropriate hierarchy in the NDOM. Process 600 then retrieves the current XBRL tag and begins the tag determination process again 608. If the XBRL tag is not a rollup tag, process 600 proceeds to step 636 and determines if the XBRL tag is a label tag. If it is a label tag, the label data is processed 638 and the data is stored in the NDOM 614 as a software element with the appropriate hierarchy in the NDOM. Process 600 then retrieves the current XBRL tag and begins the tag determination process again 608.

If it is determined that the XBRL tag is not a label tag, process 600 proceeds to step 640 and determines whether the XBRL tag is a reference tag. If it is a reference tag, the reference data is processed (step 642) and stored in the NDOM (step 614) as a software element with the appropriate hierarchy in the NDOM. Process 600 then retrieves the current XBRL tag and begins the tag determination process again (step 608). If the XBRL tag is not a reference tag, the parser stops (step 644) and the taxonomy file is closed (step 646).

The result of process 600 is an NDOM, wherein the software elements are interconnected in a hierarchal structure (e.g., a parent-child relationship between the software elements). Refer to FIG. 5, screen shot 500, for an example of an NDOM created with process 600.

System Details

Referring back to FIG. 2, RDX front end 202 (including RDX Parser 204 and RDX Manager 206) works with XBRL-formatted data files that are stored locally, over a network, over the Internet, or in any combination of sources. These documents may be, for example, ASCII text documents formatted with XBRL tags. RDX front end 202 inputs two types of XBRL documents: taxonomy documents and instance documents, and the XBRL tags within the XBRL documents define them as either XBRL taxonomies or instance documents.

Generally, to be a valid XBRL document, the tagged file is validated with the XBRL Document Type Definition ("DTD"). An exemplary XBRL DTD is included in Appendix C. The XBRL DTD describes the required and optional data elements of an XBRL document, their ordering, the required syntax, and the controlled vocabulary used in certain data elements. RDX system 100 supplements the DTD validation with optional semantic validation based on user-defined rules. For example, a user may define a rule that validates totals with related subtotals to assure the subtotals equal the total.

Once the XBRL document is processed using the XBRL DTD validation process in RDX parser 204, if the XBRL DTD rules are not satisfied, the document is rejected. If the XBRL DTD rules are satisfied and there are no user-defined rules, then XBRL parser 204 builds the NDOM. If, however, the XBRL rules are satisfied and there are user-defined rules, RDX parser 204 interprets the XBRL document, by applying the user-defined rules, and then builds the NDOM.

In one implementation, RDX parser 204, in front end 202, parses the XBRL documents using the XBRL syntax and builds a standard internal document object (an NDOM), a software construct of the XBRL document that may be used in subsequent processing of the XBRL documents. These NDOM objects (and hence the XBRL documents they represent) can be stored locally, or can be transmitted over a corporate LAN or the Internet (e.g., using HTTP, FTP, email, etc.).

Most NDOMs and accordingly the XBRL taxonomies they represent are at the reporting level of the U.S. GAAP, but most companies actually track accounts at a considerably finer level inside the business. In order to support modified tracking, XBRL allows users to create new, private taxonomies by "extending" the GAAP taxonomy. This extension is done by adding additional, company-specific elements to the GAAP taxonomy and defining the manner in which these new elements interrelate, both between themselves and the GAAP taxonomy elements. RDX system 100 accommodates the user generating new taxonomies to model individual businesses by building them on existing taxonomies, which may be available locally or across a Wide Area Network (e.g., the Internet). More specifically, XBRL manager 206 allows the user to load existing taxonomies and create new taxonomies with the appropriate instance documents referencing the newly created taxonomy.

Figure 7:
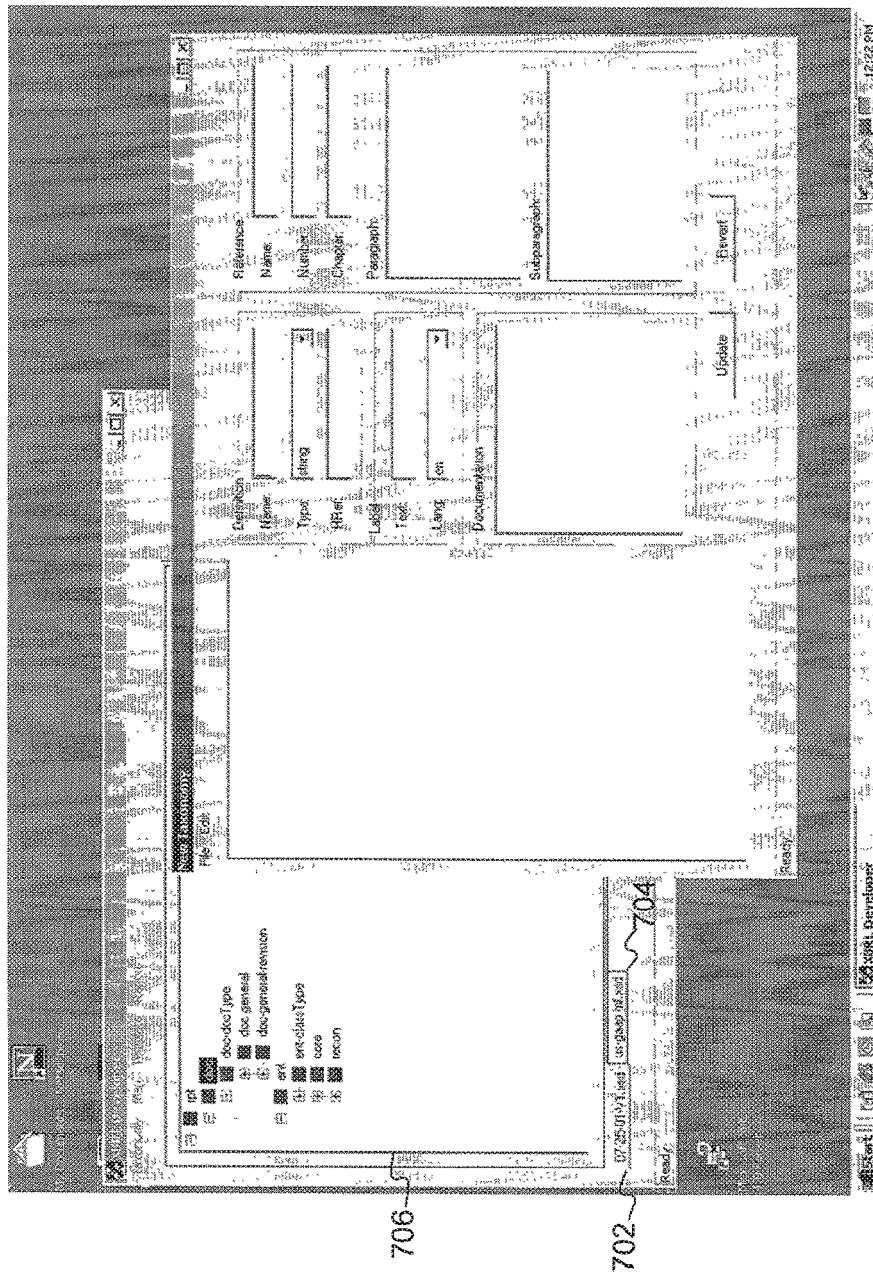
FIG. 7 is a screen shot of an exemplary existing taxonomy file.
Figure 8:
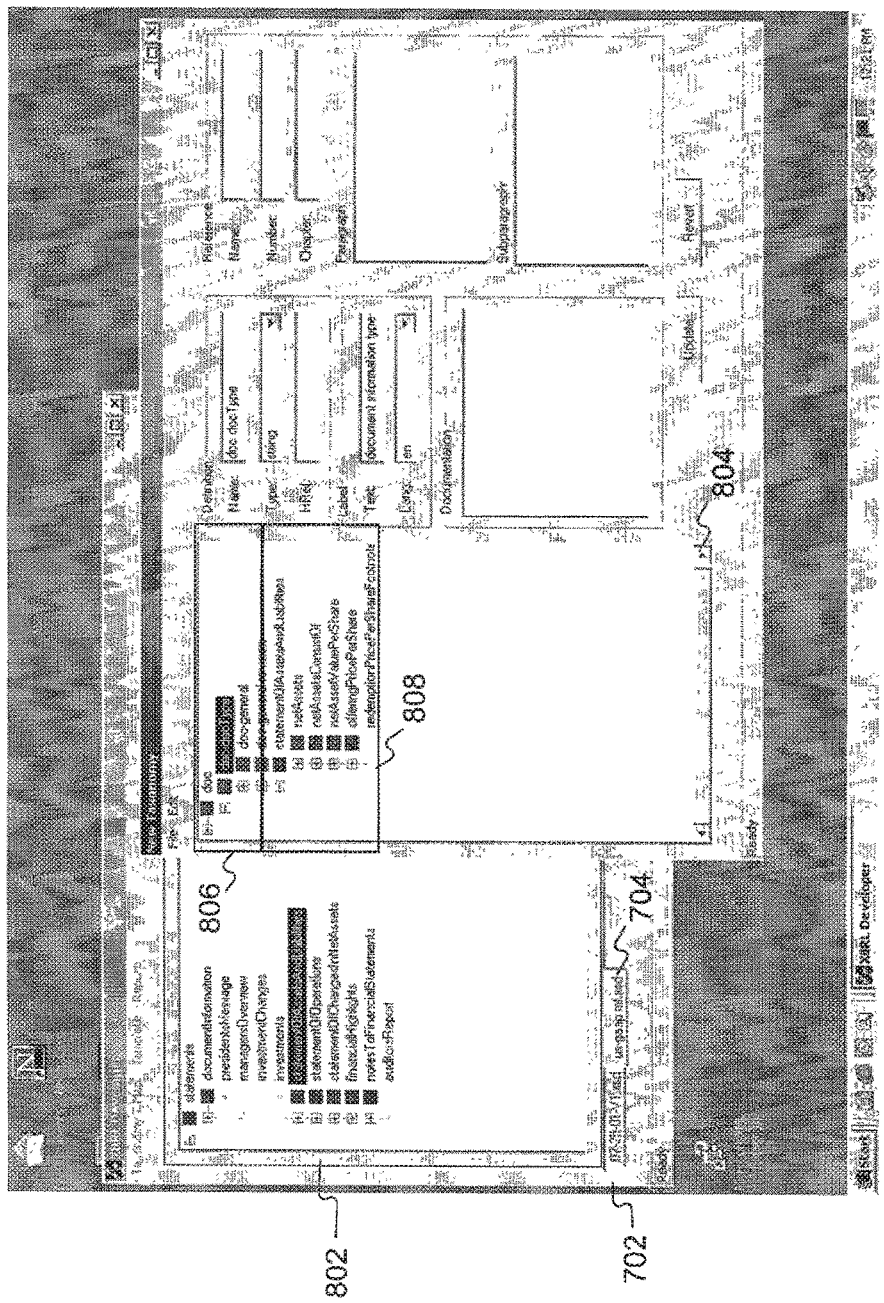
FIG. 8 is a screen shot of an exemplary existing taxonomy file and an exemplary new taxonomy generated from the combination of the exemplary existing taxonomy files of FIGS. 7 and 8.

FIGS. 7 and 8 are screenshots that illustrate an exemplary process by which a user can modify an existing taxonomy to create a new extended taxonomy. FIG. 7 illustrates existing taxonomy tabs 702 and 704. Existing taxonomy tab 702 represents existing taxonomy file "07-25-01-V1.xsd" and existing taxonomy tab 704 represents existing taxonomy file "us-gaap-mf.xsd." The elements of existing taxonomy file "07-25-01-V1.xsd" are illustrated in window 706 and the elements of existing taxonomy file "us-gaap-mf.xsd" are illustrated in window 802 of FIG. 8.

Window 804 of FIG. 8 illustrates the result of the process by which a user creates a new taxonomy from one or more existing taxonomies. To produce the result illustrated in FIG. 8, the user selects elements from the existing taxonomy file "07-25-01-V1.xsd," which are illustrated in box 806 and elements from existing taxonomy file "us-gaap-mf.xsd," which are illustrated in box 808, to produce the new taxonomy 804.

The XBRL specification generally supports two types of reporting, internal and public. Public reporting may involve summaries or high level reporting such as those seen in SEC documents, and private reporting may involve much more discrete levels in the document. For example, in high level reporting, the document may simple list one entry that is a summary of all assets, wherein in discrete-level report, the document may list all entries that compose the summary entry. Generally, summary or high level reports reference the GAAP taxonomy and are for public consumption, and internal reports reference a taxonomy derived from the GAAP and remain internal. RDX system 100 permits the editing of public report templates referencing the GAAP taxonomy to provide private reporting referencing private taxonomies that extend the GAAP.

In FIG. 2, RDX document editor 208 supports a "document template" scheme that allows the user to specify the locations of data elements but defer the retrieval of the data elements until the document is actually created. RDX document editor 208 also provides style sheet editing capabilities, which allow the user to control the display of document objects by developing XML Style Sheets and associating them with the document object. A single document object may, for example, contain a set of financial statements against which several style sheets could be applied: one to show the data in annual columns, one to show it in a quarterly breakdown, one to show it in European format, and so forth.

The actual presentation of XBRL documents is controlled by generating style sheets. User styling requests (e.g., background color, text style, report format, etc.) are translated into eXtensible Style Language ("XSL") commands. XSL is an XML-based set of instructions for output document formatting. XSL style sheets may be ASCII text documents that conform to the XML specification. As text documents, they can be edited with an ordinary text editor. However, as with other XML documents, this is time-consuming and error-prone method of editing an XML document.

To enable a user in editing an XML document, a RDX style sheet editor (not shown) acts as a report-writer: the user can graphically compose a report from a sample document, specify the XBRL instance documents that the report can apply and automatically create a style document. The style sheet editor may be a specialized version of RDX document editor 208 that has been modified to allow the insertion of valid XSL style sheet instructions. Once the styling is acceptable, the user may store the style sheet for reuse in other qualifying XBRL documents. In addition to its basic editing functions, the Style Sheet Editor provides the following additional utilities: (1) XSL validation, (2) well-formedness testing, (3) hyperlink validation, (4) cut and paste of elements, and (5) replacement of elements with defaults. Table 3 below provides an exemplary XML style sheet document in accordance with the present invention.

TABLE 3

```
<?xml version="1.0" ?>
<xsl:stylesheet version="1.0"
    xmlns:xsl="http://www.w3.org/1999/XSL/Transform"
    xmlns:xbrl="http://www.xbrl.org/core/2000-07-31/metamodel"
    xmlns:xalan="http://xml.apache.org/xalan" exclude-result-
    prefixes="xalan">
    <xsl:strip-space elements="*" />
    <xsl:output method="text" />
    <xsl:template match="/">
        <?xml version="1.0" encoding="UTF-8" standalone="no"?>
        <?xml:stylesheet type="text/xsl" href="esi1.xsl"?> <!DOCTYPE
        rdldoc> <rdldoc> <rdldoc_header rdldoc_ID = "" doc_title =
        "Converted to RDL from XBRL" timestamp = "2000-5-
        15T23:00:00" version = "1.0.0" expiration = "2000-5-
        15T23:00:00" freq_of_update = "Annual" num_line_items = "0"
        num_datapoints = "0" x_indexes = "-3,-2,-1" first_li_withdata =
        "0" > <data_source> <contact_info role = "Data Source" name =
        "Russell T. Davis" company = "e-Numerate Solutions, Inc."
        address = "8201 Greensboro Drive" city = "McLean" state = "VA"
        zip = "22102" country = "USA" email = "rdavis@e-numerate.com"
        form = "simple" href = "http://www.e-numerate.com" comments
        = "" > </contact_info> </data_source> <formatting_source>
        <contact_info role = "Formatting Source" name = "Russell T.
        Davis" company = "e-Numerate Solutions, Inc." address = "8201
        Greensboro Drive" city = "McLean" state = "VA" zip = "22102"
        country = "USA" email = "rdavis@e-numerate.com" form =
        "simple" href = "http://www.e-numerate.com" comments = "" >
        </contact_info> </formatting_source> <rdldoc_source>
        <contact_info role = "RDLDoc Source" name = "Russell T. Davis"
        company = "e-Numerate Solutions, Inc." address = "8201
        Greensboro Drive" city = "McLean" state = "VA" zip = "22102"
        country = "USA" email = "rdavis@e-numerate.com" form =
        "simple" href = "http://www.e-numerate.com" comments = "" >
        </contact_info> </rdldoc_source> <license_terms copyright_cite =
        "Copyright 2000, e-Numerate Solutions, Inc. All Rights
        Reserved" holder = "e-Numerate Solutions, Inc." license_type =
```

TABLE 3-continued

```
"Payment Per Download" warranty = "No warranty is expressed or
implied. Use this data at your own risk." disclaimer = "This data is
provided 'as-is'. The provider assumes no responsibility for its use
or misuse." terms = "All Rights Reserved, e-Numerate Solutions,
Inc." date = "2001.0629" email = "license@e-numerate.com"
state = "VA" country = "USA" > <contact_info role = "RDLDoc
Source" name = "Russell T. Davis" company = "e-Numerate
Solutions, Inc." address = "8201 Greensboro Drive" city =
"McLean" state = "VA" zip = "22102" country = "USA" email =
"rdavis@e-numerate.com" form = "simple" href = "http://www.e-
numerate.com" comments = "" > </contact_info>
</license_terms> </rdldoc_header> <line_item_set
line_item_set_type = "TimeSeries" time_period = ""
character_set = "" missing_values = "" null_values = ""
zero_values = "" dates_values = "" percentages = "" > <data_x
x_title = "Period" format = "#,##0" x_notes = "" x_desc = ""
x_prec = "0" x_unit = "" x_mag = "0" x_mod = "" x_measure = ""
x_scale = "" x_adjustment = "" x_links = "" >
<xsl:apply-templates select="/ /xbrl:group[xbrl:item][position( ) =
    1]" mode="data_x" />
</data_x>
- <xsl:variable name="unit">
    <xsl:value-of select="/ /xbrl:group/@unit" />
  </xsl:variable>
  <xsl:apply-templates select="/ /xbrl:group[xbrl:item != 0]" />
  </line_item_set> </rdldoc>
  </xsl:template>
- <xsl:template match="/ /xbrl:group">
  - <xsl:variable name="unit">
      <xsl:value-of select="/ /xbrl:group/@unit" />
    </xsl:variable>
    <line_item li_ID = "
    <xsl:number value="position( )" />
    " li_legend = "
    <xsl:value-of select="@item" />
    " li_title = "
    <xsl:value-of select="./xbrl:item/@label" />
    " li_cat = "" y_axis_title = "
    <xsl:value-of select="$unit" />
    " level = "1" format = "
    <xsl:value-of select="/ /xbrl:group/@decimalPattern" />
    " relation = "Parent li_notes = "Source: XBRL data" li_desc = ""
    li_prec = "
    <xsl:value-of select="//xbrl:group/@precision" />
    " li_unit = "
    <xsl:value-of select="$unit" />
    " li_mag = "0" li_mod = "" li_measure = "" li_scale = "
    <xsl:value-of select= "/ /xbrl:group/@scaleFactor" />
    " li_adjustment = "" > <data_y>
    <xsl:apply-templates />
    </data_y> </line_item>
  </xsl:template>
- <xsl:template match="xbrl:item">
    <xsl:value-of select="." />
    ,
  </xsl:template>
- <xsl:template match="/ /xbrl:group" mode="data_x">
    <xsl:apply-templates select="xbrl:item" mode="data_x2" />
  </xsl:template>
- <xsl:template match="xbrl:item" mode="data_x2">
    <xsl:value-of select="@period" />
  </xsl:template>
</xsl:stylesheet>
```

RDX manager 206 controls the XBRL documents present in the system. To facilitate rapid access to documents, it may maintain an in-memory cache of the documents most recently parsed and edited. It contains facilities to locate documents, both on the local machine and across a Wide Area Network. RDX Manager 206 is also charged with the security aspects of RDX system 100. It decides whether a given user has access to a document, if so, it determines the access type, e.g., read, write, delete, and also whether the user has permission to perform functions such as the scheduling of automatic document generation.

RDX document viewer 207 allows a user to view XBRL documents in their natural (NDOM) structure, which is normally tree-like, i.e., accounts and subaccounts. The viewer allows users to view extended taxonomies, that is, taxonomies that extend a basic taxonomy such as U.S. GAAP (e.g., in colors corresponding to the provenance of each hierarchical taxonomy element). Likewise, information in instance documents 222 can be annotated (e.g., color-coded) in order to understand which of several taxonomies defines the particular element.

For example, the new taxonomy generated in window 804 of FIG. 8 may be viewed with elements 806 shown in red (indicating that the elements are from the existing taxonomy file 07-25-01-V1.xsd). Likewise, elements 808 may be shown in blue (indicating that the elements are from the existing taxonomy file us-gaap-mf.xsd). In a similar fashion, in the corresponding instance document that references the color coded taxonomy document, the references to the elements of the two taxonomies will also be color coded. For example, the reference in the illustrated instance document fragment in Table 2 to the elements (e.g., cashCashEquivalentsAndShortTerminvestments.cashAndCashEquivalents) of the U.S. GAAP may be color coded in blue as the existing taxonomy file us-gaap-mf.xsd.

XBRL taxonomy documents may be standard ASCII text files that are written in the XBRL syntax, and as such, they are editable by any text-oriented editor or word processor. RDX document editor 208 is used to edit existing XBRL taxonomy documents that are manipulated and under the control of RDX manager 206. This is, however, a time-consuming and error-prone approach to editing an XBRL (or any XML) file. A specialized RDX document editor 208 allows users to quickly build XBRL instance documents from existing XBRL taxonomy elements using drag and drop techniques. The existing elements are taken from existing XBRL taxonomies (e.g., U.S. GAAP taxonomy), which are stored in RDX system 100 (FIG. 1). RDX document editor 208 makes changes, checks for errors, and views information associated with the taxonomy elements.

RDX document editor 208 supports the creation and editing of XBRL instance documents by providing a simultaneous display of the instance document and its taxonomy. (Recall that an XBRL instance document (report) may be interpreted when a taxonomy is supplied, and every line in an XBRL instance document references an item in an XBRL taxonomy.) Besides basic editing, RDX document editor 208 performs a number of utility functions such as (1) search and replace, (2) validation, (3) well-formedness testing, (4) Hyperlink validation, (5) cut and paste of elements, and (6) replacement of elements with defaults.

Figure 9:
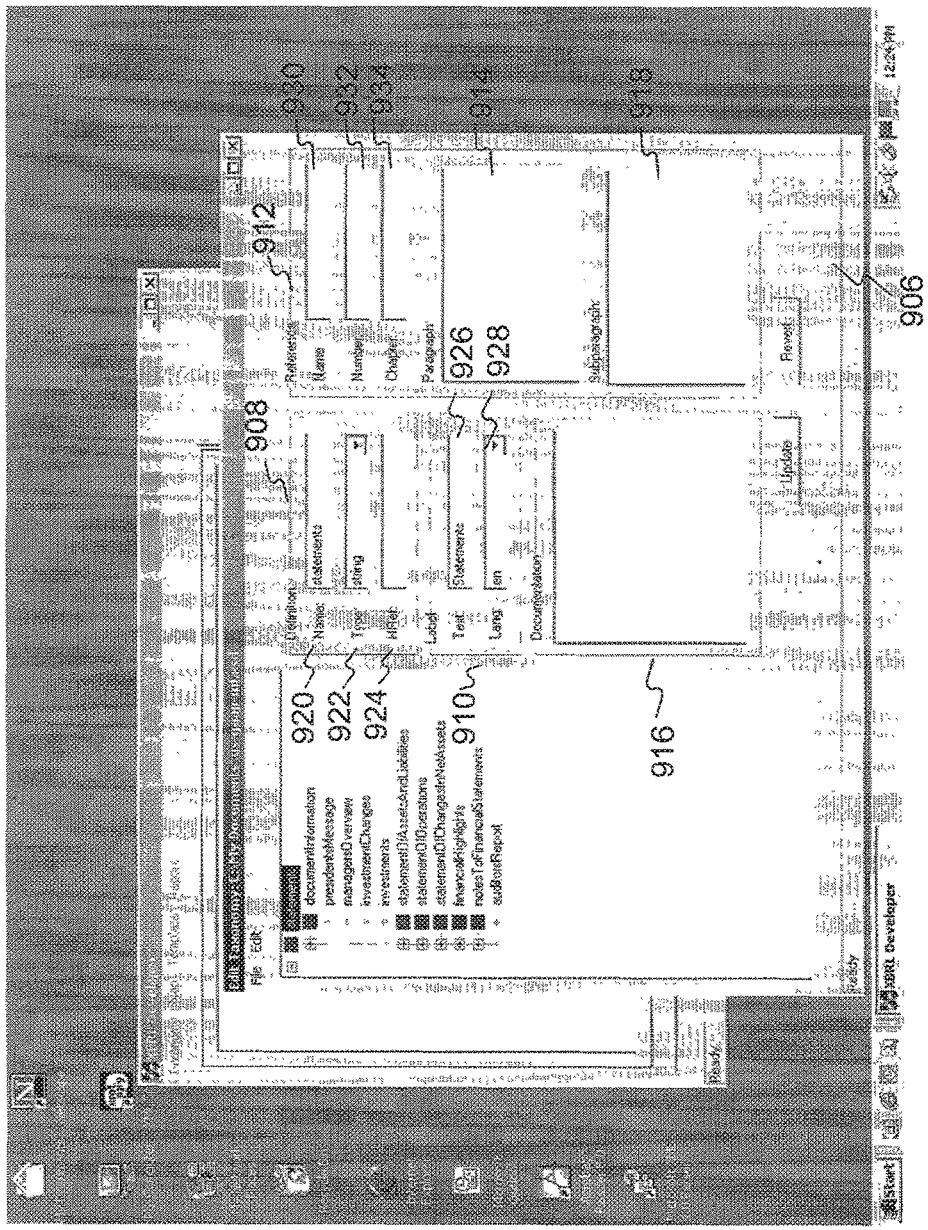
FIG. 9 is a screen shot illustrating an exemplary taxonomy window and an exemplary document window.

FIG. 9 is a screen shot showing an exemplary taxonomy window 904 on the left and an exemplary document window 906 on the right. RDX document editor 208 allows users to view, edit, and save XBRL taxonomy documents and XBRL instance documents 222 by enabling a user to manipulate the NDOM elements of the taxonomy. XBRL taxonomy documents are displayed using a "tree view" control, which allows the user to view the parent-child relationships in taxonomy window 904. Tree views are also described in detailed in U.S. patent application Ser. No. 09/573,419 entitled "Tree View for Reusable Data Markup Language" which was previously incorporated by reference. Information about the selected taxonomy element is displayed as a pop up window, such as document window 906.

In FIG. 9, document window 906 displays an exemplary taxonomy element. The user may modify attributes of the element such as the definition 908, label 910, reference 912, paragraph 914, documentation 916, and subparagraph 918 by entering data in the appropriate edit boxes of document window 906. Definition 908 includes the name 920, data type 922, and HRef 924. Name 920 provides an entry for the name of the element; data type 922 provides an entry for the data type of the element (e.g., monetary, text (string), or shares); and HRef 924 provides an entry for a link to additional data for the element at an URL or URI.

Label 910 provides an entry for the label of the element and includes text 926 and lang 928. Text 928 is the text string for label 910 and lang 928 is the language in which the text string is written. Reference 912 provides an entry for information regarding literature which describes the element. Reference 912 includes the name 930, number 932, and chapter 934. Name 930 is the reference name of the literature that describes the element. Number 932, chapter 934, paragraph 914, and subparagraph 918 represent the number, chapter, paragraph, and subparagraph in the reference which describes the element. Documentation 916 provides an entry for a description of the element.

In addition to the above, XBRL document editor 208 may also modify the relationship between the taxonomy elements and other elements in the taxonomy by dragging the element to a new position within the taxonomy and dropping the taxonomy element into the new position, thereby changing the relationship between the elements in the taxonomy.

Figure 10A:
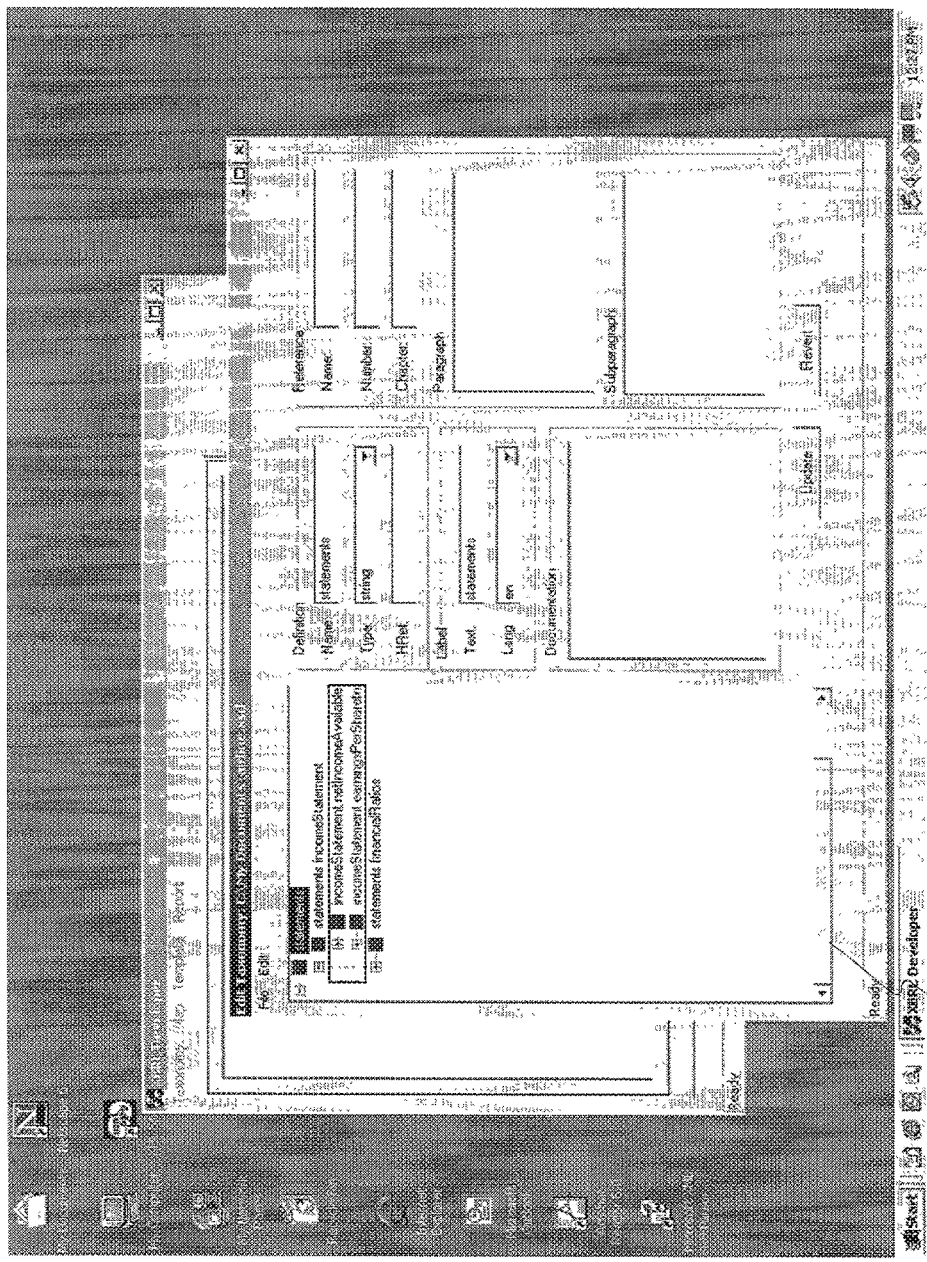
FIGS. 10A and 10B are screen shots of an exemplary excerpt of a taxonomy document illustrating an exemplary process in which a taxonomy element is dragged and dropped from one location to another within the taxonomy.
Figure 10B:
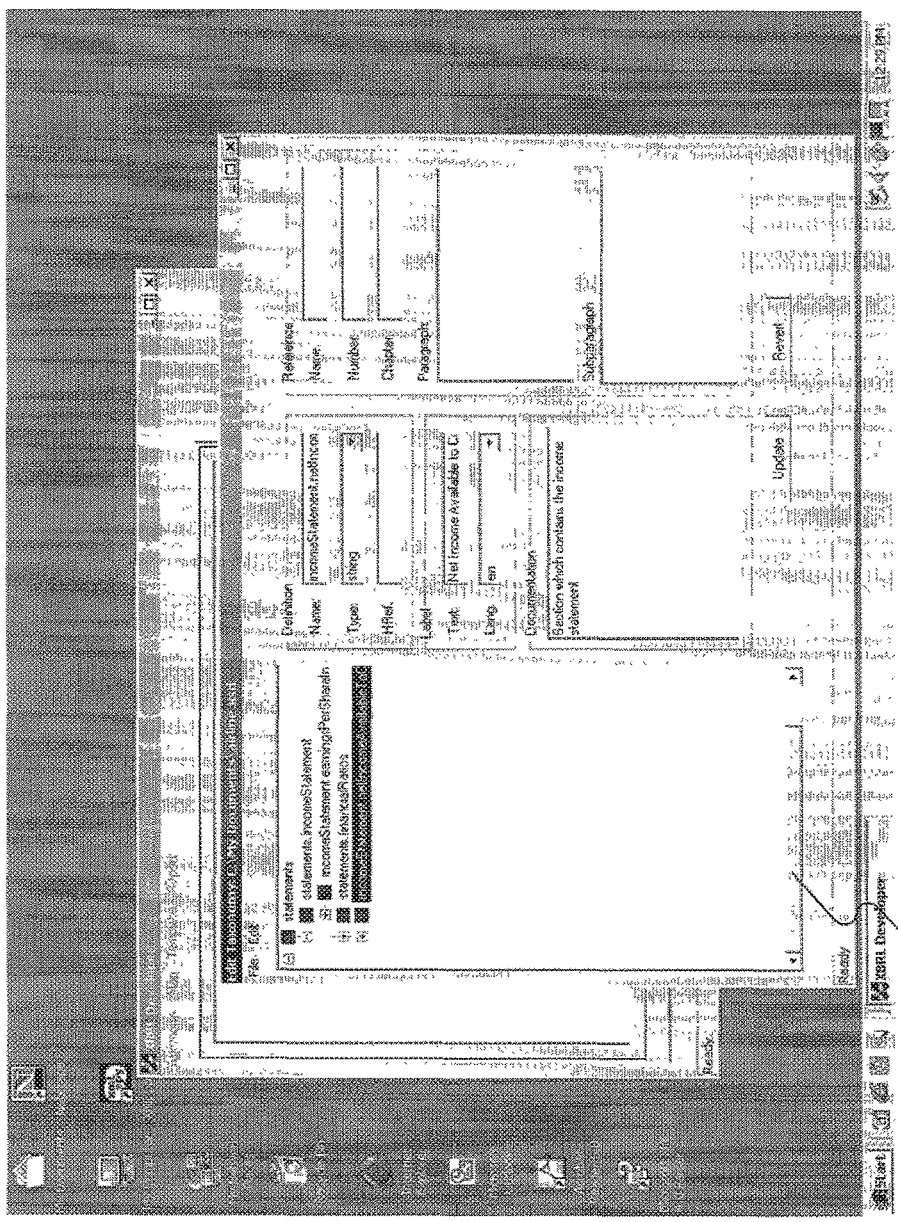

FIGS. 10A and 10B are screen shots illustrating the above-mentioned process. FIG. 10A illustrates an exemplary excerpt from a taxonomy in window 1002, where incomeStatement.netIncomeAvailable and incomeStatementeamingsPerSharein are both sub-elements to statement.incomeStatement. As an illustration of the result of dragging and dropping a taxonomy element from one position in the taxonomy to another position, FIG. 10B illustrates in window 1004 that incomeStatment.netIncomeAvailable has been moved from a sub-element to statement.incomeStatement to an element, which is of the same hierarchy as statement.incomeStatement.

Figure 11:
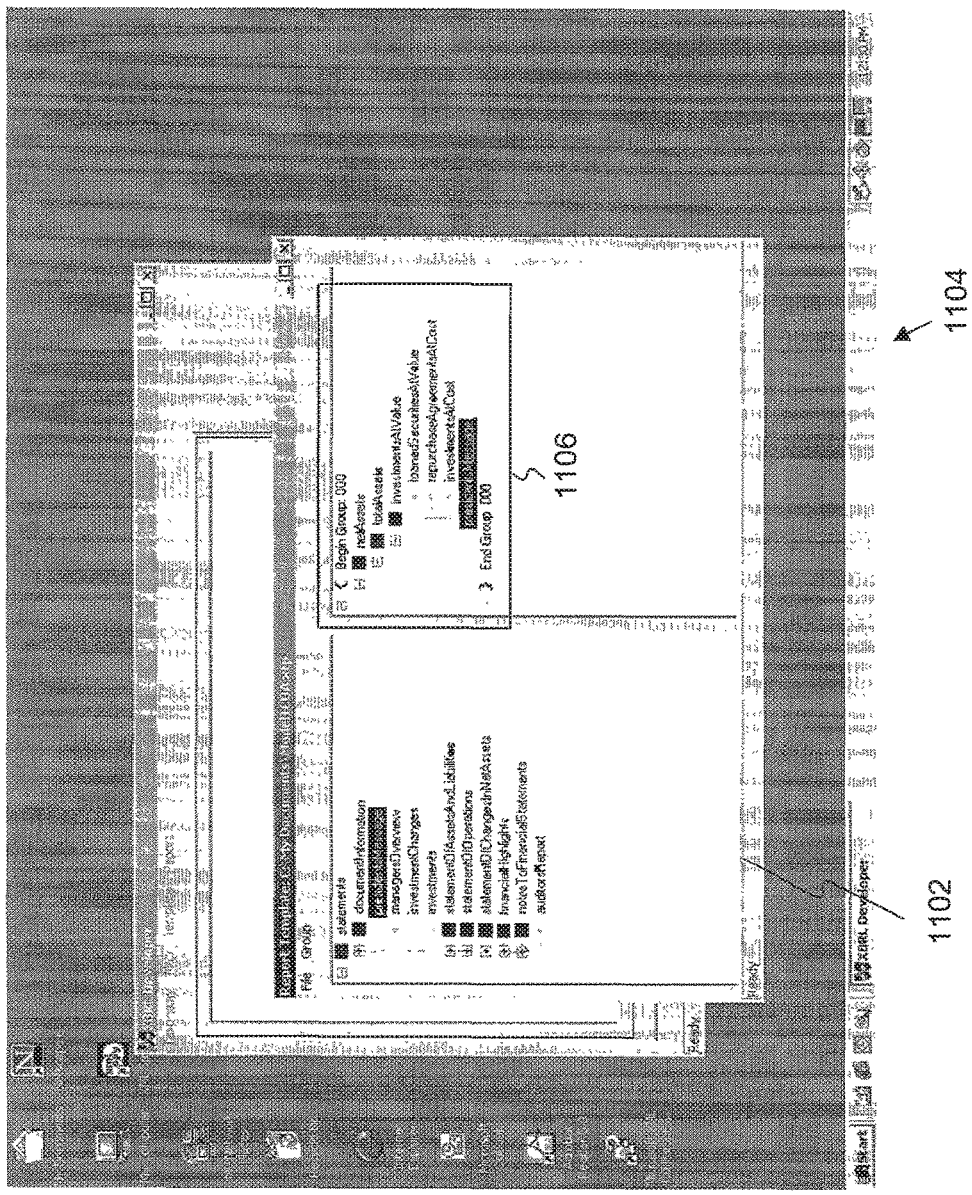
FIG. 11 is a screen shot of an exemplary taxonomy segment and an exemplary report template.

Moreover, RDX document editor 208 provides the capability of creating document templates 214 from which XBRL instance documents 222 may be generated to develop reports. FIG. 11 is a screen shot of an exemplary taxonomy segment 1102 and document template 1106. In this case, document template 1106 is designed to generate an XBRL instance document 222 to develop a report that calculates net assets (netAssets) and a text message. The net assets are calculated from the total assets (totalAssets), which include the value of an entity's investments (investmentAtValue). The entity's investment value is calculated from three sub-items identified as loanedSecu ritiesAtValue, repurchasesAgreementsAtCost, and investmentsAtCost.

Document templates 214 are supported by RDX mapper 210, either immediately or in a deferred mode to generate XBRL instance documents and reports from information retrieved from local and remote sources such as databases 216, files 218, and accounting software packages 220. RDX mapper 210 supports both the immediate entry of data into document templates 214 and the insertion of "pointers" that tell RDX system 100 where to locate data during a report generation phase. Pointers reference information in a variety of accessible locations (e.g., in files, spreadsheets, other XBRL documents, relational databases, non-relational databases (e.g., object-based databases), accounting software packages, and URL's). Such information can be either local or web-based, for example. During report generation, which can be either immediate or at one or more specified periods of time in the future, the data elements are assembled into a report and sent to a destination specified when the instance document is developed. This will be discussed below in further detail.

Figure 12:
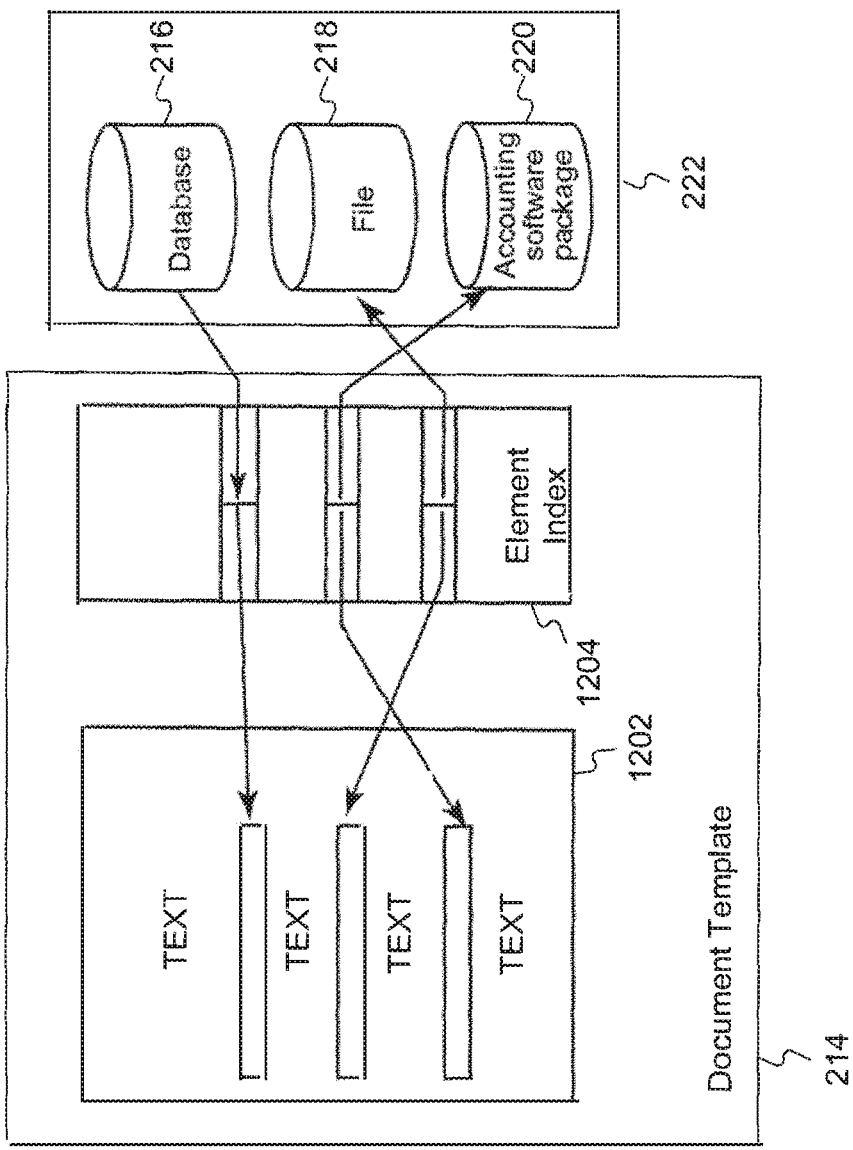
FIG. 12 is a diagram illustrating interaction between the RDX document editor, RDX mapper, and the document templates.

FIG. 12 illustrates the interaction between RDX document editor 208, RDX mapper 210, and document templates 214. In accordance with the present invention, FIG. 12 illustrates an instance document structure 1202 and an element index 1204, which compose document template 214. FIG. 12 also illustrates various information sources, such as databases 216, files 218, and accounting software package 220, for the XBRL instance document 222 to be generated. Document template 214 allows users of RDX system 100 to specify report structures in advance for "on the fly" report completion by RDX mapper 210. RDX mapper 210 uses instructions from the element index 1204 to provide data for XBRL instance documents at user-specified intervals.

In one implementation, document template 214 includes two elements: XBRL instance document structure 1202, and an element index 1204, as shown in FIG. 12. XBRL instance document structure 1202 contains the fixed segment ("boiler plate") of the document to be created, and remains the same each time the document is created. Element index 1204, on the other hand, contains instructions as to where to locate the "dynamic" information in the XBRL instance document 222, the manner in which to access the information (e.g., RDBMS query, accounting package API call, flat file access, etc.) and where to store the information in the document. Element index 1204 also contains information on the destination for the XBRL instance document 222 and the time(s) at which the XBRL instance document 222 is to be generated.

Figure 13:
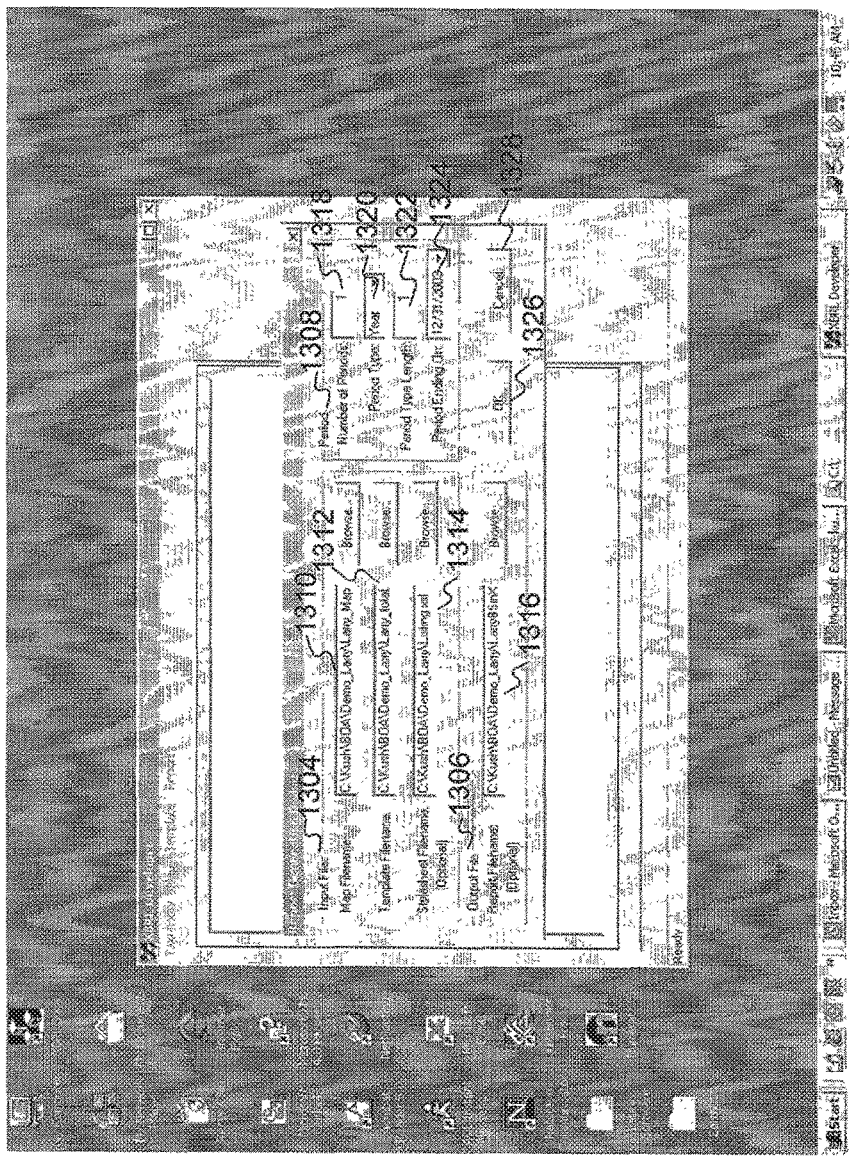
FIG. 13 is a screen shot of an exemplary report creation dialog used in generating an XBRL instance document.

After document template 214 is complete, XBRL document editor 208 may also provide the capability of creating a report or instance document using a report generation dialog as illustrated in FIG. 13. Once in report generation dialog 1302, at any time, the user has the option to exit report generation dialog 1302 by selecting the "cancel" button 1328. But, the user also has the option to enter the required and optional information into report generation dialog 1302 and execute the report by selecting the "ok" button 1326.

In report generation dialog 1302, entry blocks are provided for defining the input files 1304, output file 1306, and period 1308. In the entry blocks of input files 1304, the user defines: the map filename 1310, which contains information indicating from where the data is to be retrieved for entry into the report (see the description for FIG. 16 below for an explanation on how the information in map filename 1310 is developed); the template filename 1312 used in identifying the document template 214 from which the report will be developed; and the stylesheet filename 1314 (optional) that will be used to format the report.

In the entry block for output file 1306 (optional), the user defines the location where the generated XBRL instance document will be stored on the computer system. In the period entry block, the user defines the number of periods 1318, the period type 1320, the period type length 1322, and the period ending on 1324. Number of periods 1318 represents the total number of accounting periods that the user would like to have reported. For example, if the period ending on 1324 is Dec. 31, 2001 and the user specified the number of periods 1318 to be 2, the report produced would have data for the time period between Dec. 31, 1999 and Dec. 31, 2000, and Dec. 31, 2000 and Dec. 31, 2001. But, in the resultant XBRL instance document 222, these periods would be represented only by the ending data for each period—Dec. 31, 2000 and Dec. 31, 2001.

Period type 1320 represents the time period slice or increment that the user would like reported. This can have the type value of day, week, month, and year. Period type length 1322 further breaks down the number of periods based on period type 1320. Since XBRL's representation for a date does not include a quarter period type, this feature allows for period types of quarters and other lengths. For example, if the user specifies that period type 1320 is a month and period type length 1322 is 3, this represents a quarter. Then, if the user specified number of periods 1318 to be 4, the program would produce a report with four, three-month time periods (four quarters). The user may also use these parameters to specify any duration for a period type. As another example, the user could specify period type 1320 as a month and period type length 1322 as 6. This would produce a report with bi-annual data. The period ending on 1324 is the last day in a time period for the entire report. In the number of periods explanation above, the period ending data is Dec. 31, 2001.

If after the user enters all the required information into report generation dialog 1302, the user selects the "ok" button. An XBRL instance document 222 or report is developed as illustrated in FIG. 14. FIG. 14 illustrates an exemplary section 1402 of an XBRL instance document 222 generated without a specified optional stylesheet filename. Therefore, exemplary section 1402 is essentially displayed as a text document without much formatting.

If, however, in report generation dialog 1302, the user has specified a stylesheet filename 1314, the XBRL instance document may be generated as a highly formatted user friendly report 1500 as illustrated in FIG. 15. RDX document editor 208 generates the report by combining XSL style sheet information with the text and values from the XBRL instance document. The text and values are retrieved and inserted in the instance document 222 using document templates 214 and mapper 210. The process by which the data is retrieved is explained below in further detail. In FIG. 15, the XBRL instance document has been formatted into a report in which the information contained in the report is easily understood. In this instance, the XBRL instance document displayed has been formatted, for example, with title 1502, subtitle 1504, subtotal 1506, and column 1508.

As mentioned above, the data that is retrieved and inserted in the instance document are retrieved from one or more sources through the use of the XBRL tags. For example, XBRL tags add documentation to "pure data" found in relational databases. That is, the data that already exists in relational databases can be used to create XBRL instance documents, and the information concerning the database location and the database structure (i.e., the query parameters) are made available to RDX mapper 210. XBRL tags can also be added to information found in "flat" (i.e., unstructured) files and information obtained from internal accounting systems, as with relational structures, by knowing where to look (i.e., file location) and the manner in which to look (i.e., the internal structure and formatting of the data file).

The connections to data files are relatively easy; RDX mapper 210 may use either the internal host file system or a data transfer protocol (e.g., TCP/IP across a Wide Area Network (e.g., the Internet)). Access to relational files typically involves building an Object Data Base Connection ("ODBC") to the database in order to execute the query. The ODBC uses a standard language for submitting data queries to the database. Access to data in other accounting systems typically involve an application program interface ("API") to the system. An alternative for accessing data from an external accounting system is to use the system's export facility to dump the information in a flat file and then to access the flat file directly.

Figure 16:
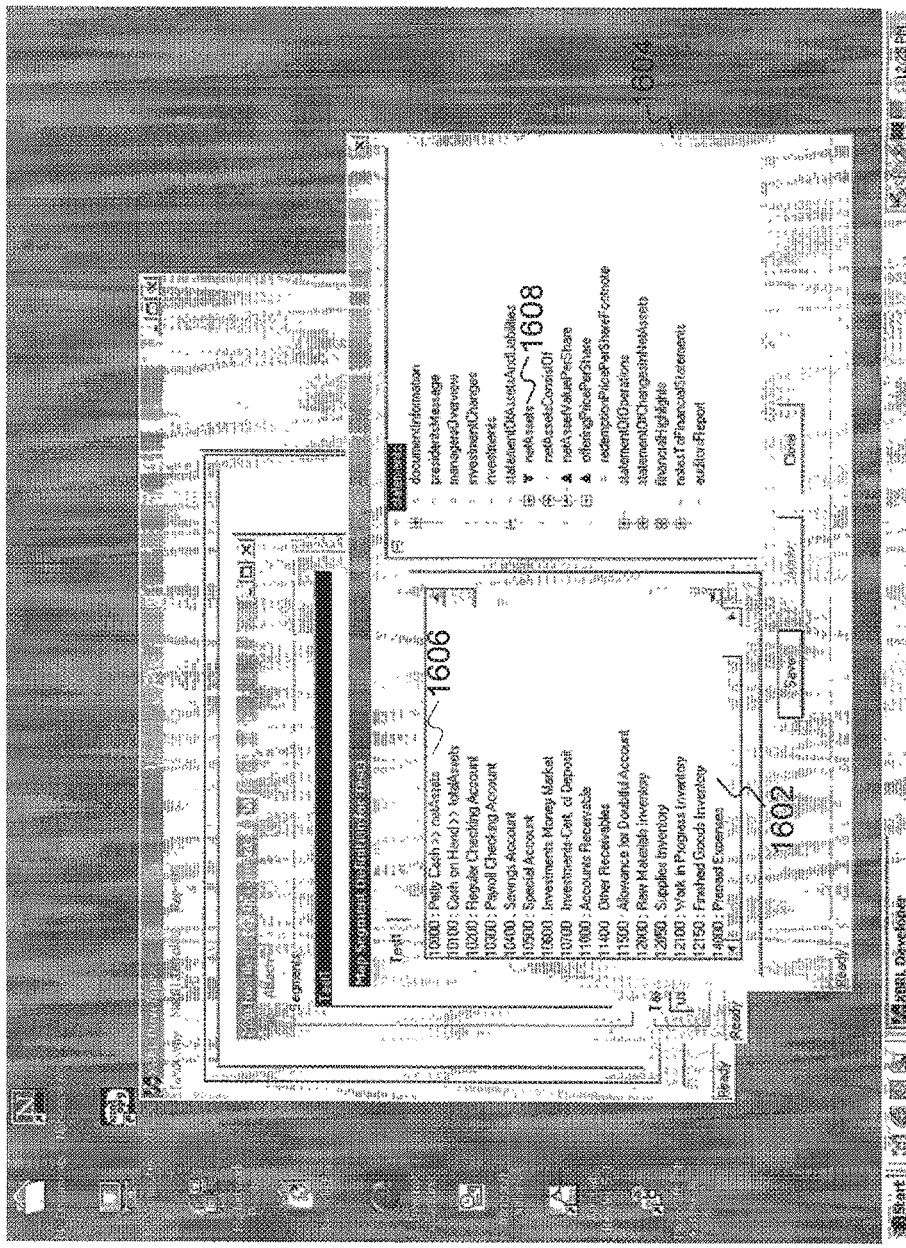
FIG. 16 is a screen shot of an exemplary map segment definition screen, where the map is generated between the data locations and the values of the XBRL instance document or report.

FIG. 16 illustrates a map segment definition screen 1600. Once RDX mapper 210 is connected to the data files, the user, through map segment definition screen 1600, may generate the map file from which the values within the instance document are retrieved. Window 1602 lists the various data files in the database, while window 1604 displays an exemplary instance document. The user generates the map file by selecting a listed data file such as Petty Cash>>netAssets 1606 and dragging it to the appropriate location within the instance document, such as netAssets 1608. The link between the data file and the instance document item is represented by associating a colored icon with the instance document item and changing the color of the data file name to the same color as the icon.

To support the creation of XBRL instance documents 222 or reports from document templates 214, RDX mapper 210 maintains a list of document templates 214 in a queue (not shown) waiting to be published. Document templates 214 may contain time tags indicating when the underlying document should be assembled. At regular intervals, RDX mapper 210 scans the list to see if any documents are due for publishing. As the time arrives for document generation, the data for the document is assembled from the information sources specified in document templates 214. Using document templates 214 and the NDOM, the instance document structure 1202 is loaded, and the instructions in element index 1204 are followed to access and load the dynamic data. Once XBRL instance documents 222 have been completely assembled and, when XSL style sheet information is present and properly formatted, XBRL instance documents 222 are validated and sent to the destination specified in document templates 214. Finally, document templates 214 are examined; if it is a "one-shot" request, it is dropped from the queue. Otherwise, a new generation time for the template is calculated, and it is returned to the template queue.

In FIG. 2, to utilize the data analysis capabilities of RDL system 106, RDL tagger 212 converts documents in the NDOM format to objects in the RDL format, and RDL system 106 operates on these objects as if they were received from RDL files. In one implementation, RDL tagger 212 functions as an XBRL-specific input conduit to RDL system 106. The user may compare, view, store and manipulate these objects; the user may also combine these products with RDL objects from other sources, thereby achieving new insights not available from XBRL documents alone.

As mentioned earlier, XBRL taxonomy documents are stored in the RDX system as NDOM data objects. These objects are adequate for any manipulation, modification and management of taxonomy documents, but are generally used in concert with other taxonomy documents. A taxonomy may be extended or one or more taxonomies may be used to create a new taxonomy.

In addition to the capabilities provided by RDX system 100, the user may also employ the analytic capabilities of the RDL system. The NDOM object is typically translated into an RDL data object. RDL tagger 212 performs this function by analyzing the structure of the NDOM object and translating the NDOM into one or more RDL objects containing the actual NDOM data. This data can then be analyzed, manipulated and compared with RDL object data from both XBRL and non-XBRL sources in the RDL viewer.

Figure 17:
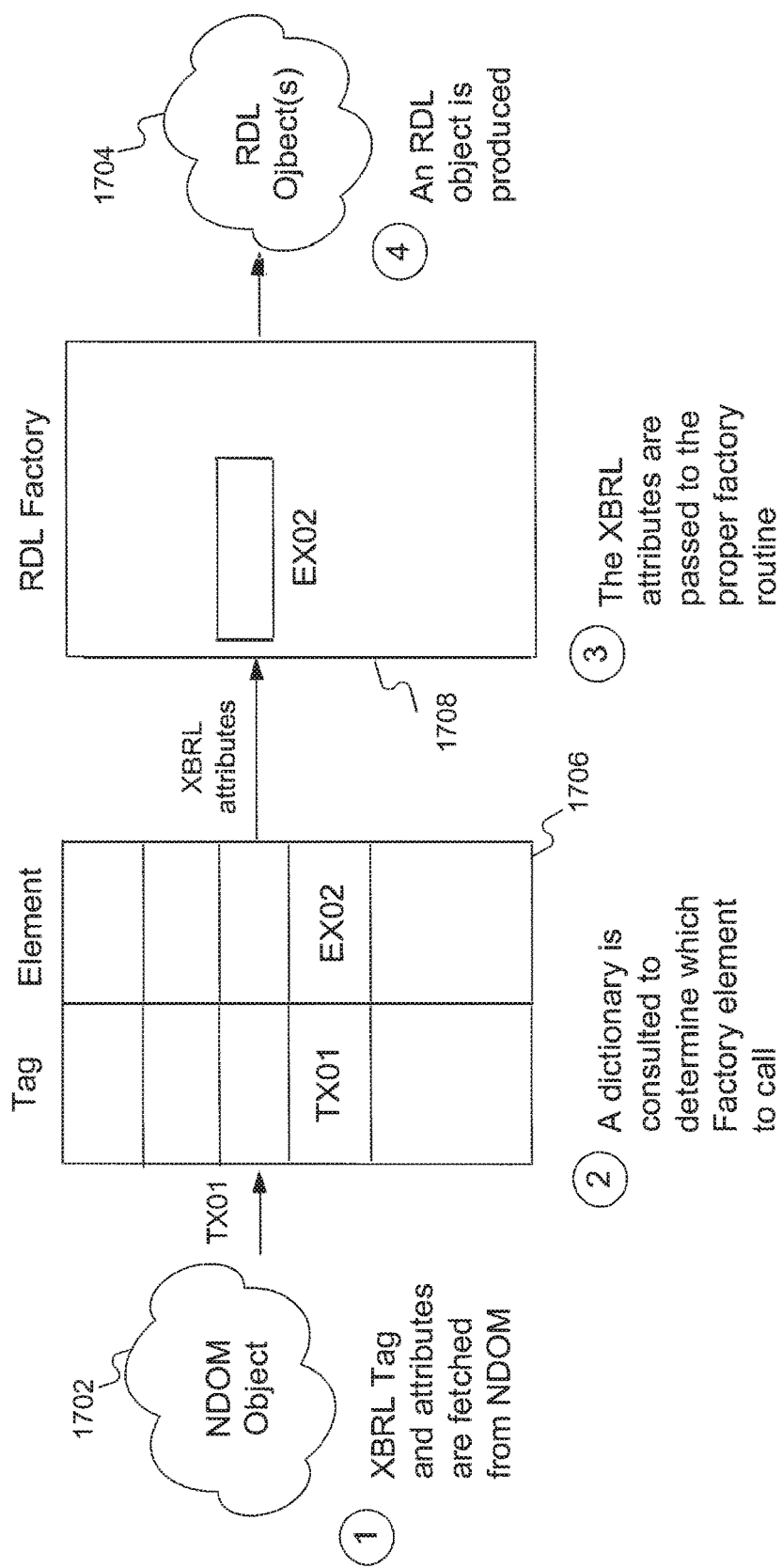
FIG. 17 is a diagram illustrating an exemplary translation process in which an XBRL element is translated to an RDL element.

FIG. 17 illustrates an exemplary process for RDL tagger 212 to map an NDOM object 1702 to one or more RDL data objects 1704 that can be processed by RDL system 106 of FIG. 1. RDL tagger 212 maintains an XBRL tag dictionary 1706 and a translation factory 1708 containing a corresponding list of translation processes necessary for each tag. RDL tagger 212 accesses the elements of the NDOM (i.e., the tags) sequentially and then looks up the element in the dictionary and invokes the translation routine in translation factory 1708 for the element, passing a translation routine within translation factory 1708, the attributes and values associated with the element. This process continues until all the elements have been processed. At this point, translation factory 1708 produces the corresponding RDL data object(s) 1704, which is passed to RDL system 106 (FIG. 1) in the same manner as a translated RDL file.

An example of an XBRL/RDL translation could be represented by the element "total revenues" in an XBRL report. In XBRL, "total revenues" appears as two revenue tags bracketing period tags:

```
<revenues><period>1990</period><amount>100</amount></revenues>
<revenues><period>1991</period><amount>110</amount></revenues>
<revenues><period>1992</period><amount>122</amount></revenues>
```

This is XML according to the XBRL specification. In RDL, this becomes:

```
<data_set name="revenues" type="time_series">
<data_x>1990,1991,1992</data_x>
<data_y>100,110,122</data_y>
</data_set>
```

This is also valid XML, but appears different.

In the above translation process, factory elements are software functions that render the translations. Each element accepts an input XBRL text string and outputs RDL. The factory isolates the input process from knowledge of the RDL objects. The job of input processing is to collect all XBRL text strings with the same tag, e.g., the revenue tag above. These strings are passed to translation factory 1708, which is responsible for knowing which translation (factory) element to create for a given tag. The factory identifies the input tag and creates an instance of the software (factory element) that is responsible for that particular conversion. The factory element is run with the strings collected by input processing as input, and the result is copied to an output file. Appendix D provides some examples of the instances created to accomplish the conversions.

The foregoing description of an implementation of the present invention has been presented for purposes of illustration and description. It is not exhaustive and does not limit the present invention to the precise form disclosed. Modifications and variations are possible in light of the above teaching or may be acquired from practicing of the present invention. The scope of the present invention is defined by the claims and their equivalents.

APPENDIX A

```xml
<?xml version="1.0" encoding="utf-8"?>
<!-- Created: 7/28/2000 5:11:16 PM -->
<!-- targetNamespace names what we are defining -->
<!-- schemaLocation pairs up namespaces with actual files (URLs)
    since we are using the metamodel namespace, we use the schemaLocation
    to point to the metamodel file.
    If there were an XHTML schema, we could have put in another pair of
    entries for the XHTML namespace and its file.
    The extra whitespace characters in the schemaLocation content should
    improve readability and will not bother applications.
-->

<schema  xmlns="http://www.w3.org/1999/XMLSchema"
    xmlns:html="http://www.w3.org/1999/xhtml"
        xmlns:xbrl="http://www.xbrl.org/core/2000-07-31/metamodel"
            xmlns:ci="http://www.xbrl.org/us/gaap/ci/2000-07-31"
    targetNamespace="http://www.xbrl.org/us/gaap/ci/2000-07-31">

<element name="ci:statements" type="string">
                <annotation>
                        <appinfo>
                                <xbrl:label xml:lang="en">Statements</xbrl:label>
                        </appinfo>
                </annotation>
        </element>
        <element name="ci:statements.documentInformation" type="string">
                <annotation>
                        <documentation>Section which contains information which
describes the document.</documentation>
                        <appinfo>
                                <xbrl:rollup to="ci:statements" weight="0" order="1" />
                                <xbrl:label xml:lang="en">Document Information</xbrl:label>
                        </appinfo>
                </annotation>
        </element>
        <element name="ci:documentInformation.generalDocumentInformation"
type="string">
                <annotation>
                        <documentation>Section for general information about the
document.</documentation>
                        <appinfo>
                                <xbrl:rollup to="ci:statements.documentInformation"
weight="0" order="1" />
```

```xml
            <xbrl:label xml:lang="en">General Document Information</xbrl:label>
        </appinfo>
    </annotation>
</element>
<element name="ci:generalDocumentInformation.identifier" type="string">
    <annotation>
        <documentation>String or number used to uniquely identify the resource. Examples for networked resources include URLs and URNs (when implemented). Other globally-unique identifiers,such as International Standard Book Numbers (ISBN) or other formal names would also be candidates for this element in the case of off-line resources.</documentation>
        <appinfo>
            <xbrl:rollup to="ci:documentInformation.generalDocumentInformation" weight="0" order="1" />
            <xbrl:label xml:lang="en">Identifier</xbrl:label>
        </appinfo>
    </annotation>
</element>
<element name="ci:generalDocumentInformation.date" type="date">
    <annotation>
        <documentation>The date the resource was made available in its present form. Recommended best practice is an 8 digit number in the form YYYY-MM-DD as defined in http://www.w3.org/TR/NOTE-datetime, a profile of ISO 8601. In this scheme, the date element 1994-11-05 corresponds to November 5, 1994.</documentation>
        <appinfo>
            <xbrl:rollup to="ci:documentInformation.generalDocumentInformation" weight="0" order="2" />
            <xbrl:label xml:lang="en">Date</xbrl:label>
        </appinfo>
    </annotation>
</element>
<element name="ci:generalDocumentInformation.title" type="string">
    <annotation>
        <documentation>The name given to the resource by the CREATOR or PUBLISHER</documentation>
        <appinfo>
            <xbrl:rollup to="ci:documentInformation.generalDocumentInformation" weight="0" order="3" />
            <xbrl:label xml:lang="en">Title</xbrl:label>
        </appinfo>
    </annotation>
</element>
<element name="ci:generalDocumentInformation.description" type="string">
    <annotation>
```

```
                    <documentation>A textual description of the content of the
resource, including abstracts in the case of document-like objects or content
descriptions in the case of visual resources.</documentation>
                    <appinfo>
                        <xbrl:rollup
to="ci:documentInformation.generalDocumentInformation" weight="0" order="4" />
                        <xbrl:label xml:lang="en">Description</xbrl:label>
                    </appinfo>
                </annotation>
            </element>
            <element name="ci:generalDocumentInformation.creator" type="string">
                <annotation>
                    <documentation>The person or organization primarily responsible
for creating the intellectual content of the resource.</documentation>
                    <appinfo>
                        <xbrl:rollup
to="ci:documentInformation.generalDocumentInformation" weight="0" order="5" />
                        <xbrl:label xml:lang="en">Creator</xbrl:label>
                    </appinfo>
                </annotation>
            </element>
            <element name="ci:generalDocumentInformation.language" type="string">
                <annotation>
                    <documentation>Language of the intellectual content of the
resource. Where practical, the content of this field should coincide ISO 639-1988
language codes.</documentation>
                    <appinfo>
                        <xbrl:rollup
to="ci:documentInformation.generalDocumentInformation" weight="0" order="6" />
                        <xbrl:label xml:lang="en">Language</xbrl:label>
                    </appinfo>
                </annotation>
            </element>
            <element name="ci:documentInformation.revisions" type="string">
                <annotation>
                    <documentation>Section which contains information about
document revisions.</documentation>
                    <appinfo>
                        <xbrl:rollup to="ci:statements.documentInformation"
weight="0" order="2" />
                        <xbrl:label xml:lang="en">Revisions</xbrl:label>
                    </appinfo>
                </annotation>
            </element>
            <element name="ci:revisions.revision" type="string">
                <annotation>
```

```
                    <documentation>Container for each revision to the
document.</documentation>
                    <appinfo>
                        <xbrl:rollup to="ci:documentInformation.revisions" weight="0" order="1" />
                        <xbrl:label xml:lang="en">Revision</xbrl:label>
                    </appinfo>
                </annotation>
            </element>
            <element name="ci:revision.revisionDate" type="date">
                <annotation>
                    <documentation>Date of this revision.</documentation>
                    <appinfo>
                        <xbrl:rollup to="ci:revisions.revision" weight="0" order="1" />
                        <xbrl:label xml:lang="en">Revision Date</xbrl:label>
                    </appinfo>
                </annotation>
            </element>
            <element name="ci:revision.revisionBy" type="string">
                <annotation>
                    <documentation>Name of who made the
revision.</documentation>
                    <appinfo>
                        <xbrl:rollup to="ci:revisions.revision" weight="0" order="2" />
                        <xbrl:label xml:lang="en">Revised By</xbrl:label>
                    </appinfo>
                </annotation>
            </element>
            <element name="ci:revision.revisionDescription" type="string">
                <annotation>
                    <documentation>Descriptive information about the
revision.</documentation>
                    <appinfo>
                        <xbrl:rollup to="ci:revisions.revision" weight="0" order="3" />
                        <xbrl:label xml:lang="en">Description</xbrl:label>
                    </appinfo>
                </annotation>
            </element>
            <element name="ci:documentInformation.userDefinedDocumentInformation" type="string">
                <annotation>
                    <documentation>Section which can be used by document creators to add additional document information if they so choose.</documentation>
                    <appinfo>
                        <xbrl:rollup to="ci:statements.documentInformation" weight="0" order="3" />
```

```xml
                <xbrl:label xml:lang="en">User Defined Document Information</xbrl:label>
            </appinfo>
        </annotation>
    </element>
    <element name="ci:statements.entityInformation" type="string">
        <annotation>
            <documentation>Section which contains information which describes the entity issuing the document</documentation>
            <appinfo>
                <xbrl:rollup to="ci:statements" weight="0" order="2" />
                <xbrl:label xml:lang="en">Entity Information</xbrl:label>
            </appinfo>
        </annotation>
    </element>
    <element name="ci:entityInformation.identifiers" type="string">
        <annotation>
            <documentation>Section which contains various identifiers for the company.</documentation>
            <appinfo>
                <xbrl:rollup to="ci:statements.entityInformation" weight="0" order="1" />
                <xbrl:label xml:lang="en">Identifiers</xbrl:label>
            </appinfo>
        </annotation>
    </element>
    <element name="ci:identifiers.entityName" type="string">
        <annotation>
            <documentation>Name of the entity</documentation>
            <appinfo>
                <xbrl:rollup to="ci:entityInformation.identifiers" weight="0" order="1" />
                <xbrl:label xml:lang="en">Entity Name</xbrl:label>
            </appinfo>
        </annotation>
    </element>
    <element name="ci:identifiers.formerNames" type="string">
        <annotation>
            <documentation>Section which contains former names of the entity. May contain many former names</documentation>
            <appinfo>
                <xbrl:rollup to="ci:entityInformation.identifiers" weight="0" order="2" />
                <xbrl:label xml:lang="en">Former Names</xbrl:label>
            </appinfo>
        </annotation>
```

```
</element>
<element name="ci:formerNames.formerName" type="string">
    <annotation>
        <documentation>Former name of the entity</documentation>
        <appinfo>
            <xbrl:rollup to="ci:identifiers.formerNames" weight="0" order="1" />
            <xbrl:label xml:lang="en">Former Name</xbrl:label>
        </appinfo>
    </annotation>
</element>
```

APPENDIX B

```xml
<?xml version="1.0"?>
<!-- Created by XBRL Solutions, Inc. XBRLDOM -->
<group
      xmlns="http://www.xbrl.org/core/2000-07-31/instance"
      xmlns:ci="http://www.xbrl.org/us/gaap/ci/2000-07-31"

xmlns:air="http://www.xbrlSolutions.com/Public/Demos/EdgarOnline/Repository/Taxonomies/air"

xmlns:aag="http://www.xbrlSolutions.com/Public/Demos/EdgarOnline/Repository/XBRL/Airlines/AlaskaAirGroup/AlaskaAirGroup"

schemaLocation="http://www.xbrlSolutions.com/Public/Demos/EdgarOnline/Repository/XBRL/Airlines/AlaskaAirGroup/AlaskaAirGroup c:/Schema/AlaskaAirGroup.xsd"
      id=""
      type="ci:statements"
      entity="Alaska Air Group, Inc."
      unit="ISO4217:USD"
      scaleFactor="6"
      precision="10"
      decimalPattern="#.#"
      formatName=""
>
<group type='ci:statements.balanceSheet'>
    <group
type='ci:cashCashEquivalentsAndShortTermInvestments.cashAndCashEquivalents'>
        <label href='xpointer(..)' xml:lang='en'>Cash and cash equivalents</label>
        <item period='1998-12-31'>29.4</item>
        <item period='1999-12-31'>132.5</item>
    </group>
    <group type='ci:shortTermInvestments.marketableSecurities'>
        <label href='xpointer(..)' xml:lang='en'>Marketable securities</label>
        <item period='1998-12-31'>277.2</item>
        <item period='1999-12-31'>196.5</item>
    </group>
    <group type='ci:currentAssets.receivablesNet'>
        <label href='xpointer(..)' xml:lang='en'>Receivables - less allowance for doubtful accounts (1998 - $1.0; 1999 - $1.0)</label>
        <item period='1998-12-31'>70.6</item>
        <item period='1999-12-31'>74.6</item>
    </group>
    <group type='ci:currentAssets.inventoriesNet'>
        <label href='xpointer(..)' xml:lang='en'>Inventories and supplies</label>
        <item period='1998-12-31'>44.1</item>
```

```xml
    <item period='1999-12-31'>54.3</item>
</group>
<group type='ci:currentAssets.prepaidExpenses'>
    <label href='xpointer(..)' xml:lang='en'>Prepaid expenses and other assets</label>
    <item period='1998-12-31'>107.5</item>
    <item period='1999-12-31'>124.0</item>
</group>
<group type='ci:assets.currentAssets'>
    <label href='xpointer(..)' xml:lang='en'>TOTAL CURRENT ASSETS</label>
    <item period='1998-12-31'>528.8</item>
    <item period='1999-12-31'>581.9</item>
</group>
<group type='air:propertyPlantAndEquipmentGross.flightEquipment'>
    <label href='xpointer(..)' xml:lang='en'>Flight equipment</label>
    <item period='1998-12-31'>1015.4</item>
    <item period='1999-12-31'>1386.6</item>
</group>
<group type='ci:propertyPlantAndEquipmentGross.otherPropertyPlantAndEquipment'>
    <label href='xpointer(..)' xml:lang='en'>Other property and equipment</label>
    <item period='1998-12-31'>283.2</item>
    <item period='1999-12-31'>337.2</item>
</group>
<group type='air:propertyPlantAndEquipmentGross.advancesFlightEquipment'>
    <label href='xpointer(..)' xml:lang='en'>Deposits for future flight equipment</label>
    <item period='1998-12-31'>164.9</item>
    <item period='1999-12-31'>217.7</item>
</group>
<group type='ci:propertyPlantAndEquipmentNet.accumulatedDepreciationAndAmortization'>
    <label href='xpointer(..)' xml:lang='en'>Less accumulated depreciation and amortization</label>
    <item period='1998-12-31'>-417.0</item>
    <item period='1999-12-31'>-486.7</item>
</group>
<group type='air:capitalLeasedAssetsGross.flightEquipment'>
    <label href='xpointer(..)' xml:lang='en'>CAPITAL LEASES - Flight and other equipment</label>
    <item period='1998-12-31'>44.4</item>
    <item period='1999-12-31'>44.4</item>
</group>
<group type='ci:capitalLeasedAssetsNet.accumulatedAmortizationCapitalLeasedAssets'>
    <label href='xpointer(..)' xml:lang='en'>CAPITAL LEASES - Less accumulated amortization</label>
    <item period='1998-12-31'>-29.6</item>
```

```xml
        <item period='1999-12-31'>-31.8</item>
    </group>
    <group type='ci:noncurrentAssets.intangibleAssetsNet'>
        <label href='xpointer(..)' xml:lang='en'>INTANGIBLE ASSETS - SUBSIDIARIES</label>
        <item period='1998-12-31'>57.5</item>
        <item period='1999-12-31'>55.5</item>
    </group>
    <group type='ci:noncurrentAssets.otherAssets'>
        <label href='xpointer(..)' xml:lang='en'>OTHER ASSETS</label>
        <item period='1998-12-31'>84.2</item>
        <item period='1999-12-31'>75.3</item>
    </group>
    <group type='ci:balanceSheet.assets'>
        <label href='xpointer(..)' xml:lang='en'>TOTAL ASSETS</label>
        <item period='1998-12-31'>1731.8</item>
        <item period='1999-12-31'>2180.1</item>
    </group>
    <group type='ci:accountsPayableAndAccruedExpenses.accountsPayable'>
        <label href='xpointer(..)' xml:lang='en'>Accounts payable</label>
        <item period='1998-12-31'>84.3</item>
        <item period='1999-12-31'>104.2</item>
    </group>
    <group type='air:otherCurrentLiabilities.accruedAircraftRent'>
        <label href='xpointer(..)' xml:lang='en'>Accrued aircraft rent</label>
        <item period='1998-12-31'>75.5</item>
        <item period='1999-12-31'>81.8</item>
    </group>
    <group type='ci:currentLiabilities.employeeRelatedLiabilities'>
        <label href='xpointer(..)' xml:lang='en'>Accrued wages, vacation and payroll taxes</label>
        <item period='1998-12-31'>79.4</item>
        <item period='1999-12-31'>83.0</item>
    </group>
    <group type='air:otherNoncurrentLiabilities.otherNoncurrentLiabilities'>
        <label href='xpointer(..)' xml:lang='en'>Other accrued liabilities</label>
        <item period='1998-12-31'>80.9</item>
        <item period='1999-12-31'>99.5</item>
    </group>
    <group type='air:otherCurrentLiabilities.airTrafficLiability'>
        <label href='xpointer(..)' xml:lang='en'>Air traffic liability</label>
        <item period='1998-12-31'>178.6</item>
        <item period='1999-12-31'>183.7</item>
    </group>
    <group type='ci:currentLiabilities.currentPortionOfLongTermDebt'>
```

```
        <label href='xpointer(..)' xml:lang='en'>Current portion of long-term debt and
capital lease obligations</label>
        <item period='1998-12-31'>27.2</item>
        <item period='1999-12-31'>66.5</item>
    </group>
    <group type='ci:liabilities.currentLiabilities'>
        <label href='xpointer(..)' xml:lang='en'>TOTAL CURRENT LIABILITIES</label>
        <item period='1998-12-31'>525.9</item>
        <item period='1999-12-31'>618.7</item>
    </group>
    <group type='ci:noncurrentLiabilities.longTermDebt'>
        <label href='xpointer(..)' xml:lang='en'>LONG-TERM DEBT AND CAPITAL LEASE
OBLIGATIONS</label>
        <item period='1998-12-31'>171.5</item>
        <item period='1999-12-31'>337.0</item>
    </group>
    <group type='aag:otherNoncurrentLiabilities.deferredIncomeTaxes'>
        <label href='xpointer(..)' xml:lang='en'>Deferred income taxes</label>
        <item period='1998-12-31'>99.2</item>
        <item period='1999-12-31'>144.0</item>
    </group>
    <group type='aag:otherNoncurrentLiabilities.deferredIncome'>
        <label href='xpointer(..)' xml:lang='en'>Deferred income</label>
        <item period='1998-12-31'>41.5</item>
        <item period='1999-12-31'>37.4</item>
    </group>
    <group type='aag:otherNoncurrentLiabilities.otherNoncurrentLiabilities'>
        <label href='xpointer(..)' xml:lang='en'>Other liabilities</label>
        <item period='1998-12-31'>104.2</item>
        <item period='1999-12-31'>112.3</item>
    </group>
    <group type='ci:noncurrentLiabilities.otherNoncurrentLiabilities'>
        <label href='xpointer(..)' xml:lang='en'>ADDED - TOTAL OTHER LIABILITIES
AND CREDITS</label>
        <item period='1998-12-31'>244.9</item>
        <item period='1999-12-31'>293.7</item>
    </group>
    <group type='ci:liabilitiesAndStockholdersEquity.liabilities'>
        <label href='xpointer(..)' xml:lang='en'>ADDED - TOTAL LIABILITIES</label>
        <item period='1998-12-31'>942.3</item>
        <item period='1999-12-31'>1249.4</item>
    </group>
    <group type='ci:liabilitiesAndStockholdersEquity.commitmentsAndContingencies'>
        <label href='xpointer(..)' xml:lang='en'>COMMITMENTS</label>
        <item period='1998-12-31'>0.0</item>
        <item period='1999-12-31'>0.0</item>
```

```xml
</group>
<group type='ci:stockholdersEquity.preferredStock'>
    <label href='xpointer(..)' xml:lang='en'>Preferred stock, $1 par value Authorized: 5,000,000 shares</label>
    <item period='1998-12-31'>0.0</item>
    <item period='1999-12-31'>0.0</item>
</group>
<group type='ci:stockholdersEquity.commonStock'>
    <label href='xpointer(..)' xml:lang='en'>Common stock, $1 par value Authorized: 100,000,000 shares Issued: 1998 - 28,974,107 shares 1999 - 29,157,108 shares</label>
    <item period='1998-12-31'>29.0</item>
    <item period='1999-12-31'>29.2</item>
</group>
<group type='ci:stockholdersEquity.additionalPaidInCapital'>
    <label href='xpointer(..)' xml:lang='en'>Capital in excess of par value</label>
    <item period='1998-12-31'>473.9</item>
    <item period='1999-12-31'>480.0</item>
</group>
<group type='ci:stockholdersEquity.treasuryStock'>
    <label href='xpointer(..)' xml:lang='en'>Treasury stock, at cost: 1998 - 2,750,102 shares 1999 - 2,746,304 shares</label>
    <item period='1998-12-31'>-62.7</item>
    <item period='1999-12-31'>-62.7</item>
</group>
<group type='ci:stockholdersEquity.unearnedCompensation'>
    <label href='xpointer(..)' xml:lang='en'>Deferred compensation</label>
    <item period='1998-12-31'>-1.3</item>
    <item period='1999-12-31'>-0.6</item>
</group>
<group type='ci:stockholdersEquity.retainedEarnings'>
    <label href='xpointer(..)' xml:lang='en'>Retained earnings</label>
    <item period='1998-12-31'>350.6</item>
    <item period='1999-12-31'>484.8</item>
</group>
<group type='ci:liabilitiesAndStockholdersEquity.stockholdersEquity'>
    <label href='xpointer(..)' xml:lang='en'>TOTAL SHAREHOLDERS EQUITY</label>
    <item period='1998-12-31'>789.5</item>
    <item period='1999-12-31'>930.7</item>
</group>
<group type='ci:balanceSheet.liabilitiesAndStockholdersEquity'>
    <label href='xpointer(..)' xml:lang='en'>TOTAL LIABILITIES AND SHAREHOLDERS' EQUITY</label>
    <item period='1998-12-31'>1731.8</item>
    <item period='1999-12-31'>2180.1</item>
</group>
```

```
</group>
</group>
```

APPENDIX C

```
<!ENTITY % att_AttributeHolder "
id              IDREF#IMPLIED
period CDATA    #IMPLIED
schemaLocation  CDATA    #IMPLIED
scaleFactor CDATA    #IMPLIED
precision   CDATA    #IMPLIED
type        CDATA    #IMPLIED
unit        CDATA    #IMPLIED
entity  CDATA    #IMPLIED
decimalPattern  CDATA    #IMPLIED
formatName CDATA    #IMPLIED
">

<!ELEMENT group (item | group | label)*>
<!ATTLIST group
%att_AttributeHolder;
>

<!ELEMENT item (#PCDATA)>
<!ATTLIST item
%att_AttributeHolder;
>

<!ELEMENT label (#PCDATA)>
<!ATTLIST label
href    CDATA    #IMPLIED
```

APPENDIX D

XBRL DOCUMENT

```
// XBRLDocument.h: interface for the XBRLDocument class.
//
////////////////////////////////////////////////////////////// if !defined(AFX_XBRLDOCUMENT_H__BF316DE2_F5F4_11D4_82CC_005004F1C044__INCLUDED_)
define AFX_XBRLDOCUMENT_H__BF316DE2_F5F4_11D4_82CC_005004F1C044__INCLUDED if _MSC_VER > 1000
pragma once
endif // _MSC_VER > 1000 include <fstream.h> class XBRLTaxonomy;

class XBRLDocument
{
public:
        virtual void persist(fstream &of) const;
        void setTargetNamespace(CString ns);
        CString getTargetNamespace() const;
        void setURL(CString u);
        CString getURL() const;

XBRLDocument();
        virtual ~XBRLDocument();

protected:
        CString targetNamespace;

private:
        CString url;

};

#endif // !defined(AFX_XBRLDOCUMENT_H__BF316DE2_F5F4_11D4_82CC_005004F1C044__INCLUDED_)
```

XBRL EXCEPTION

```
// XBRLException.h: interface for the XBRLException class.
//
////////////////////////////////////////////////////////////////////// if !defined(AFX_XBRLEXCEPTION_H__2B1BFB42_A2C8_11D4_82CC_005004F1C044__INCLUDED_)
define AFX_XBRLEXCEPTION_H__2B1BFB42_A2C8_11D4_82CC_005004F1C044__INCLUDED_ if _MSC_VER > 1000
pragma once
endif // _MSC_VER > 1000 class XBRLException
{
public:
        CString getMessage() const;
        int getCode() const;
        const void* getReference() const;
        XBRLException();
        XBRLException(CString m);
        XBRLException(CString m, int code, const void *r);
        virtual ~XBRLException();

protected:
        void setMessage(CString m);

private:
        CString message;
        const void *reference;
        int code;
};

#endif // !defined(AFX_XBRLEXCEPTION_H__2B1BFB42_A2C8_11D4_82CC_005004F1C044__INCLUDED_)
```

XBRL GROUP

```cpp
// XBRLGroup.h: interface for the XBRLGroup class.
//
////////////////////////////////////////////////////// if !defined(AFX_XBRLGROUP_H__275BEA81_90A0_11D5_82CC_005004F1C044__INCLUDED_)
define AFX_XBRLGROUP_H__275BEA81_90A0_11D5_82CC_005004F1C044__INCLUDED if _MSC_VER > 1000
pragma once
endif // _MSC_VER > 1000 class XMLElement;

class XBRLGroup
{
public:
        XBRLGroup();
        XBRLGroup(CMapStringToPtr *cmss);
        virtual ~XBRLGroup();

void addBlock(CMapStringToPtr *cmss);
        void popBlock();

const XMLElement* getElement(CString attr);
        const CMapStringToPtr* getCurrentGroup();

void valuesForName(CString name,CStringList *csl) const;
        bool valueForName(CString name,CString &v) const;

static const CString list[];
        static const int listLength;

private:

CPtrList cpl;

bool isValidElement(CString e);
};
```

```
#endif //
!defined(AFX_XBRLGROUP_H__275BEA81_90A0_11D5_82CC_005004F1C044__IN
CLUDED_)
```

XBRL INSTANCEDOC

```cpp
// XBRLInstanceDocument.h: interface for the XBRLInstanceDocument class.
//
////////////////////////////////////////////////////////////// if !defined(AFX_XBRLINSTANCEDOCUMENT_H__14EE796E_8A99_11D5_82CC_0050
04F1C044__INCLUDED_)
#define AFX_XBRLINSTANCEDOCUMENT_H__14EE796E_8A99_11D5_82CC_005004F1C04
4__INCLUDED_ if _MSC_VER > 1000
pragma once
endif // _MSC_VER > 1000 include "XBRLDocument.h"
include "XBRLTaxonomy.h"

class XBRLInstanceElement;

class XBRLInstanceDocument : public XBRLDocument
{
public:
        XBRLInstanceDocument();
        virtual ~XBRLInstanceDocument();

void addEntry(XBRLInstanceElement *xbri);
        const XBRLTaxonomy* getTaxonomy(CString url);

static const CString uri;

private:

CMapStringToPtr entry;
        CMapStringToPtr schema;

};
```

```
#endif //
!defined(AFX_XBRLINSTANCEDOCUMENT_H__14EE796E_8A99_11D5_82CC_0050
04F1C044__INCLUDED_)

// XBRLInstanceElement.h: interface for the XBRLInstanceElement class.
//
////////////////////////////////////////////////////////////////////// if
!defined(AFX_XBRLINSTANCEELEMENT_H__211EB4A0_A878_11D5_82CC_005004
F1C044__INCLUDED_)
#define
AFX_XBRLINSTANCEELEMENT_H__211EB4A0_A878_11D5_82CC_005004F1C044
__INCLUDED_ if _MSC_VER > 1000
pragma once
endif // _MSC_VER > 1000 include "XBRLTaxonomy.h"

class XBRLTaxonomyElement;

class XBRLInstanceElement
{
public:
        XBRLInstanceElement(CString pd,CString e,CString t,CString u,int sf,int p,
                            CString dp,CString fn,CString sv,CString ur);
        virtual ~XBRLInstanceElement();

bool isSameAs(const XBRLInstanceElement *xbri) const;
        CString getPeriod() const;
        CString getEntity() const;
        CString getURI() const;

void setLocation(const XBRLTaxonomy *x, const XBRLTaxonomyElement *xe);

static const char* fields[];
        static const int fieldCount;

protected:
        XBRLInstanceElement();

private:

CString period;
```

```
        CString entity;
        CString type;
        CString unit;
        int precision;
        int scaleFactor;
        CString decimalPattern;
        CString formatName;

CString stringValue;
        CString uri;

const XBRLTaxonomy *xbt;
        const XBRLTaxonomyElement *xbte;
};

#endif //
!defined(AFX_XBRLINSTANCEELEMENT_H__211EB4A0_A878_11D5_82CC_005004
F1C044__INCLUDED_)
```

XBRL INSTANCE ELEMENT

```
// XBRLInstanceElement.h: interface for the XBRLInstanceElement class.
//
////////////////////////////////////////////////////////////////////// if
!defined(AFX_XBRLINSTANCEELEMENT_H__211EB4A0_A878_11D5_82CC_005004
F1C044__INCLUDED_)
#define
AFX_XBRLINSTANCEELEMENT_H__211EB4A0_A878_11D5_82CC_005004F1C044
__INCLUDED_ if _MSC_VER > 1000
pragma once
endif // _MSC_VER > 1000 include "XBRLTaxonomy.h"

class XBRLTaxonomyElement;

class XBRLInstanceElement
{
public:
        XBRLInstanceElement(CString pd,CString e,CString t,CString u,int sf,int p,
                        CString dp,CString fn,CString sv,CString ur);
```

```
        virtual ~XBRLInstanceElement();

bool isSameAs(const XBRLInstanceElement *xbri) const;
        CString getPeriod() const;
        CString getEntity() const;
        CString getURI() const;

void setLocation(const XBRLTaxonomy *x, const XBRLTaxonomyElement *xe);

static const char* fields[];
        static const int fieldCount;

protected:
        XBRLInstanceElement();

private:

CString period;
        CString entity;
        CString type;
        CString unit;
        int precision;
        int scaleFactor;
        CString decimalPattern;
        CString formatName;

CString stringValue;
        CString uri;

const XBRLTaxonomy *xbt;
        const XBRLTaxonomyElement *xbte;
};

#endif //
!defined(AFX_XBRLINSTANCEELEMENT_H__211EB4A0_A878_11D5_82CC_005004
F1C044__INCLUDED_)
```

XBRLLABEL

```
// XBRLLabel.h: interface for the XBRLLabel class.
//
//////////////////////////////////////////////////////////////////////
```

```
#if
!defined(AFX_XBRLLABEL_H__412DE860_F865_11D4_82CC_005004F1C044__INCL
UDED_)
#define
AFX_XBRLLABEL_H__412DE860_F865_11D4_82CC_005004F1C044__INCLUDED_ if _MSC_VER > 1000
pragma once
endif // _MSC_VER > 1000 include <fstream.h> class XBRLLabel
{
public:
        void persistLabel(fstream &of, CString hdr) const;
        void setLabelForLanguage(CString lang, CString label);
        CString getLabel(CString key) const;
        XBRLLabel();
        XBRLLabel(const XBRLLabel &xlbl);
        XBRLLabel(CMapStringToString *cmss);
        virtual ~XBRLLabel();
        void addLabel(CString lang, CString lbl);
        const CMapStringToString* getMap();

private:
        CMapStringToString label;

};

#endif //
!defined(AFX_XBRLLABEL_H__412DE860_F865_11D4_82CC_005004F1C044__INCL
UDED_)
```

XBRLLABEL ELEMENT

```
// XBRLLabelElement.h: interface for the XBRLLabelElement class.
//
////////////////////////////////////////////////////////////// if
!defined(AFX_XBRLLABELELEMENT_H__78F16481_9409_11D5_82CC_005004F1C0
44__INCLUDED_)
```

```
#define
AFX_XBRLLABELELEMENT_H__78F16481_9409_11D5_82CC_005004F1C044__INCLUDED_ if _MSC_VER > 1000
pragma once
endif // _MSC_VER > 1000 include "XMLAttribute.h"

class XBRLLabelElement
{
public:
        XBRLLabelElement(XMLAttribute *xe,CString lan,CString lab);
        virtual ~XBRLLabelElement();

protected:
        XBRLLabelElement();

private:
        XMLAttribute type;
        CString lang;
        CString label;

};

#endif // !defined(AFX_XBRLLABELELEMENT_H__78F16481_9409_11D5_82CC_005004F1C044__INCLUDED_)
```

XBRL STREAMABLE

```
// XBRLStreamable.h: interface for the XBRLStreamable class.
//
////////////////////////////////////////////////////////////////////// if !defined(AFX_XBRLSTREAMABLE_H__6F0536E1_1574_11D5_82CC_005004F1C044__INCLUDED_)
define AFX_XBRLSTREAMABLE_H__6F0536E1_1574_11D5_82CC_005004F1C044__INCLUDED_ if _MSC_VER > 1000
pragma once
```

```
endif // _MSC_VER > 1000 include <fstream.h> class XBRLStreamable
{
public:
        XBRLStreamable();
        virtual ~XBRLStreamable();

protected:
        DWORD persistMapToIStream(const CMapStringToString *cmss, IStream *is) const;
        DWORD persistIntToIStream(int ix, IStream *is) const;
        DWORD persistCStringToIStream(CString s, IStream *is) const;

CMapStringToString* readMapFromIStream(IStream *is);
        CString readCStrFromIStream(IStream *is);
        int readIntFromIStream(IStream *is);
};

#endif // !defined(AFX_XBRLSTREAMABLE_H__6F0536E1_1574_11D5_82CC_005004F1C044__INCLUDED_)
```

XBRL TAXONOMY

```
// XBRLTaxonomy.h: interface for the XBRLTaxonomy class.
//
////////////////////////////////////////////////////////////////////// if !defined(AFX_XBRLTAXONOMY_H__BF316DE0_F5F4_11D4_82CC_005004F1C044__INCLUDED_)
define AFX_XBRLTAXONOMY_H__BF316DE0_F5F4_11D4_82CC_005004F1C044__INCLUDED_ if _MSC_VER > 1000
pragma once
endif // _MSC_VER > 1000 include "XBRLDocument.h"

include <fstream.h>
```

```
class XBRLTaxonomyElement;

#include "XBRLStreamable.h"

include <afxole.h> class XBRLTaxonomy : public XBRLDocument, public XBRLStreamable
{
public:
        void resolve();
        XBRLTaxonomyElement* resolve(CString name, CString uri) const;
        void addElement(XBRLTaxonomyElement *xte);
        XBRLTaxonomy();
        virtual ~XBRLTaxonomy();

static const CString uri;

private:

XBRLTaxonomyElement* resolve(CString n) const;

CString buildKey(XBRLTaxonomyElement *xbte) const;
        CString buildKey(CString name, CString uri) const;

CMapStringToPtr element;
        CPtrList elementList;

CStringList uriList;

};

#endif // !defined(AFX_XBRLTAXONOMY_H__BF316DE0_F5F4_11D4_82CC_005004F1C044__INCLUDED_)
```

XBRL TAXONOMY CACHE

```
// XBRLTaxonomyCache.h: interface for the XBRLTaxonomyCache class.
//
//////////////////////////////////////////////////////////////////////
```

```
#if !defined(AFX_XBRLTAXONOMYCACHE_H__827BDBA0_97F3_11D5_82CC_005004F1C044__INCLUDED_)
define AFX_XBRLTAXONOMYCACHE_H__827BDBA0_97F3_11D5_82CC_005004F1C044__INCLUDED_ if _MSC_VER > 1000
pragma once
endif // _MSC_VER > 1000 class XBRLTaxonomy;

class XBRLTaxonomyCache
{
public:
        virtual ~XBRLTaxonomyCache();

const XBRLTaxonomy* getTaxonomy(CString url);

static XBRLTaxonomyCache* getCache();
        static void clearCache();
        static void deleteCache();

private:

XBRLTaxonomyCache();

static XBRLTaxonomyCache *theCache;

CMapStringToPtr cache;

};

#endif // !defined(AFX_XBRLTAXONOMYCACHE_H__827BDBA0_97F3_11D5_82CC_005004F1C044__INCLUDED_)
```

XBRL TAXONOMY ELEMENT

```
// XBRLTaxonomyElement.h: interface for the XBRLTaxonomyElement class.
//
//////////////////////////////////////////////////////////////////////
```

```cpp
#if !defined(AFX_XBRLTAXONOMYELEMENT_H__BF316DE1_F5F4_11D4_82CC_005004F1C044__INCLUDED_)
define AFX_XBRLTAXONOMYELEMENT_H__BF316DE1_F5F4_11D4_82CC_005004F1C044__INCLUDED_ if _MSC_VER > 1000
pragma once
endif // _MSC_VER > 1000 class XBRLTaxonomy;

include <afxole.h>
#include <fstream.h>
#include "XBRLStreamable.h"
#include "XMLAttribute.h"

class XBRLTaxonomyElement : public XBRLStreamable
{
public:
        XBRLTaxonomyElement();
        XBRLTaxonomyElement(CString n,CString u);
        XBRLTaxonomyElement(const XBRLTaxonomyElement &xbte);
        virtual ~XBRLTaxonomyElement();
        void setTaxonomy(XBRLTaxonomy *xbt);
        void setDocumentation(CString d);
        CString getName() const;
        void setRollupParameters(CString n,CString u,double o,int w);
        void addLabel(CString lang,CString text);
        void addChild(XBRLTaxonomyElement *xbte);
        CString getParentName() const;
        CString getParentURI() const;
        CString getURI() const;

private:
        XBRLTaxonomy *taxonomy;
        CString documentation;
        CString name;
        CMapStringToString label;
        CString uri;

XBRLTaxonomyElement *parent;
        CString pName;
        CString pURI;
        double order;
```

```
        int weight;

CPtrList child;

};

#endif //
!defined(AFX_XBRLTAXONOMYELEMENT_H__BF316DE1_F5F4_11D4_82CC_0050
04F1C044__INCLUDED_)
```

XML ATTRIBUTE

```
// XMLAttribute.h: interface for the XMLAttribute class.
//
////////////////////////////////////////////////////////////////////// if
!defined(AFX_XMLATTRIBUTE_H__F3F14860_A22A_11D5_82CC_005004F1C044__I
NCLUDED_)
#define
AFX_XMLATTRIBUTE_H__F3F14860_A22A_11D5_82CC_005004F1C044__INCLUD
ED_ if _MSC_VER > 1000
pragma once
endif // _MSC_VER > 1000 class XMLAttribute
{
public:
        XMLAttribute();
        XMLAttribute(CString n,CString u,CString v);
        virtual ~XMLAttribute();

bool isEmpty() const;

CString getName() const;
        CString getURI() const;
        CString getStringValue() const;

void setName(CString n);
        void setURI(CString u);
        void setStringValue(CString v);
```

```
        bool operator == (const XMLAttribute &xme);
        XMLAttribute& operator = (const XMLAttribute &xme);

bool isSameAs(const XMLAttribute &xme);

protected:
        CString name;
        CString uri;
        CString s;

};

#endif //
!defined(AFX_XMLATTRIBUTE_H__F3F14860_A22A_11D5_82CC_005004F1C044__INCLUDED_)
```

What is claimed is:

1. A non-statutory computer readable storage medium storing one or more programs, the one or more programs comprising instructions which, when executed by an electronic device, cause the electronic device to:
   generate at least one computer-readable Extensible Markup Language (XML)-compliant data document that is produced using a markup language that extends XML for reporting and that is not XML, Hypertext Markup Language (HTML), Extensible Style Language (XSL), nor Standard Generalized Markup Language (SGML), the at least one computer-readable XML-compliant data document including:
      a plurality of line items with a plurality of data values, and
      a plurality of computer-readable semantic tags that describe a semantic meaning of the data values, where the at least one computer-readable XML-compliant data document is capable of including multiple hierarchical relationships between two of the plurality of line items;
   cause a parsing of the at least one computer-readable XML-compliant data document, by causing:
      access to the at least one computer-readable XML-compliant data document, and
      identification of the multiple hierarchical relationships between the two line items, and at least one of the computer-readable semantic tags that describes the semantic meaning of at least one of the data values included in the at least one computer-readable XML-compliant data document;
   cause access to a plurality of computer-readable rules including:
      a first computer-readable rule,
      a second computer-readable rule, and
      a third computer-readable rule;
   cause processing of the at least one computer-readable XML-compliant data document, by causing:
      identification of at least a subset of the computer-readable rules including at least one of:
         the first computer-readable rule,
         the second computer-readable rule, or
         the third computer-readable rule; and
      processing of at least a portion of the data values of at least a portion of the plurality of line items of the at least one computer-readable XML-compliant data document, utilizing the at least subset of the computer-readable rules, and at least a portion of the computer-readable semantic tags of the at least one computer-readable XML-compliant data document;
   cause display of a result of a validation of the at least one computer-readable XML-compliant data document; and
   cause output of a report, by causing:
      identification of the at least one computer-readable semantic tag that describes the semantic meaning of the at least one data value included in the at least one computer-readable XML-compliant data document, and
      access to data from one or more sources to represent the at least one data value in the report.

2. The non-statutory computer readable storage medium of claim 1, and further comprising instructions which, when executed by the electronic device, cause the electronic device to operate such that the markup language includes eXtensible Business Reporting Language (XBRL), and the computer-readable XML-compliant data document is XBRL-compliant.

3. The non-statutory computer readable storage medium of claim 1, and further comprising instructions which, when executed by the electronic device, cause the electronic device to operate such that the at least one computer-readable XML-compliant data document is capable of being displayed utilizing an HTML browser for allowing review thereof.

4. The non-statutory computer readable storage medium of claim 1, and further comprising instructions which, when executed by the electronic device, cause the electronic device to operate to address a problem of requiring a formatting process to be repeated in connection with a cut-and-pasting of the data values, by storing the data values in a storage object assessable by one or more task-oriented programs capable of automated processing of the data values stored in the storage object.

5. The non-statutory computer readable storage medium of claim 1, and further comprising instructions which, when executed by the electronic device, cause the electronic device to operate to address a technical problem of separation of the data values and corresponding documentation, by encapsulating the data values and corresponding documentation together in machine-readable form that is capable of being used interactively.

6. The non-statutory computer readable storage medium of claim 1, and further comprising instructions which, when executed by the electronic device, cause the electronic device to operate to address a problem of custom programming or manual input by automatically retrieving the data values from an original document and making a necessary transformation.

7. The non-statutory computer readable storage medium of claim 1, and further comprising instructions which, when executed by the electronic device, cause the electronic device to operate such that the at least subset of the computer-readable rules includes each of:
   the first computer-readable rule,
   the second computer-readable rule, and
   the third computer-readable rule.

8. The non-statutory computer readable storage medium of claim 1, wherein the at least one computer-readable XML-compliant data document includes an extensible semantic tag-equipped markup language component and a hypertext markup language (HTML) component.

9. The non-statutory computer readable storage medium of claim 1, and further comprising instructions which, when executed by the electronic device, cause the electronic device to operate such that at least one of:
   said identification of the at least one computer-readable XML-compliant data document includes receiving the at least one computer-readable XML-compliant data document;
   said at least one computer-readable XML-compliant data document includes a reusable data markup language (RDML) document;
   said line items are associated with a record, row, table, or other entity of a relational database;
   said computer-readable semantic tags are applied to the plurality of line items;
   said parsing includes at least one of: eliminating white space, dividing input into words or groups of words, searching for opening or closing characters, relaying an error notice, or coordinating updating of component states;

said computer-readable rules being stored in a document type definition (DTD);
said computer-readable datatype rule is configured for validation of a data value format;
said computer-readable calculation rule is configured for validation of a summation involving data values;
said computer-readable unit rule is configured for validation of a currency of data values;
said at least one computer-readable semantic tag is the same as the at least portion of the computer-readable semantic tags;
said report is another instance of the at least one computer-readable XML-compliant data document;
said processing includes error checking; or
said result includes an indication as to whether a defect is critical or not.

10. A method, comprising:
at an electronic device:
generating at least one computer-readable Extensible Markup Language (XML)-compliant data document that is produced using a markup language that extends XML for reporting and that is not XML, Hypertext Markup Language (HTML), Extensible Style Language (XSL), nor Standard Generalized Markup Language (SGML), the at least one computer-readable XML-compliant data document including:
a plurality of line items with a plurality of data values, and
a plurality of computer-readable semantic tags that describe a semantic meaning of the data values, where the at least one computer-readable XML-compliant data document is capable of including multiple hierarchical relationships between two of the plurality of line items;
causing a parsing of the at least one computer-readable XML-compliant data document, by causing:
access to the at least one computer-readable XML-compliant data document, and
identification of the multiple hierarchical relationships between the two line items, and at least one of the computer-readable semantic tags that describes the semantic meaning of at least one of the data values included in the at least one computer-readable XML-compliant data document;
causing an access to a plurality of computer-readable rules including:
a first computer-readable rule,
a second computer-readable rule, and
a third computer-readable rule;
causing processing of the at least one computer-readable XML-compliant data document, by causing:
identification of at least a subset of the computer-readable rules including at least one of:
the first computer-readable rule,
the second computer-readable rule, or
the third computer-readable rule; and
processing of at least a portion of the data values of at least a portion of the plurality of line items of the at least one computer-readable XML-compliant data document, utilizing the at least subset of the computer-readable rules, and at least a portion of the computer-readable semantic tags of the at least one computer-readable XML-compliant data document;
causing display of a result of a validation of the at least one computer-readable XML-compliant data document; and
causing output of a report, by causing:
identification of the at least one computer-readable semantic tag that describes the semantic meaning of the at least one data value included in the at least one computer-readable XML-compliant data document, and
access to data from one or more sources to represent the at least one data value in the report.

11. The method of claim 10, wherein the markup language is eXtensible Business Reporting Language (XBRL).

12. The method of claim 10, wherein the at least one computer-readable XML-compliant data document is capable of being displayed utilizing an HTML browser.

13. The method of claim 10, wherein a technical problem of requiring a formatting process to be repeated in connection with a cut-and-pasting of the data values is addressed, by storing the data values in a storage object assessable by one or more task-oriented programs capable of automated processing of the data values stored in the storage object.

14. The method of claim 10, wherein a technical problem of separation of the data values and corresponding documentation is addressed, by encapsulating the data values and the corresponding documentation together in machine-readable form that is capable of being used interactively.

15. The method of claim 10, where the at least subset of the computer-readable rules includes each of:
the first computer-readable rule,
the second computer-readable rule, and
the third computer-readable rule.

16. The method of claim 10, and further comprising addressing a problem of requiring references to physical locations for the data values, by referring to the data values by a position thereof.

17. A method, comprising:
at an electronic device:
generating at least one computer-readable Extensible Markup Language (XML)-compliant data document that is produced using eXtensible Business Reporting Language (XBRL), the at least one computer-readable XML-compliant data document including:
a plurality of line items with a plurality of data values, and
a plurality of computer-readable semantic tags that describe a semantic meaning of the data values, where the at least one computer-readable XML-compliant data document is capable of including multiple hierarchical relationships between two of the plurality of line items;
causing a parsing of the at least one computer-readable XML-compliant data document, by causing:
access to the at least one computer-readable XML-compliant data document, and
identification of the multiple hierarchical relationships between the two line items, and at least one of the computer-readable semantic tags that describes the semantic meaning of at least one of the data values included in the at least one computer-readable XML-compliant data document;
causing an access to a plurality of computer-readable rules including:
a first computer-readable rule,
a second computer-readable rule, and
a third computer-readable rule;

causing processing of the at least one computer-readable XML-compliant data document, by causing:
  identification of at least a subset of the computer-readable rules including at least one of:
    the first computer-readable rule,
    the second computer-readable rule, or
    the third computer-readable rule; and
  processing of at least a portion of the data values of at least a portion of the plurality of line items of the at least one computer-readable XML-compliant data document, utilizing the at least subset of the computer-readable rules, and at least a portion of the computer-readable semantic tags of the at least one computer-readable XML-compliant data document;
causing display of a result of a validation of the at least one computer-readable XML-compliant data document; and
causing output of a report, by causing:
  identification of the at least one computer-readable semantic tag that describes the semantic meaning of the at least one data value included in the at least one computer-readable XML-compliant data document, and
  access to data from one or more sources to represent the at least one data value in the report.

18. The method of claim 17, where the at least subset of the computer-readable rules includes each of:
  the first computer-readable rule,
  the second computer-readable rule, and
  the third computer-readable rule.

* * * * *

UNITED STATES PATENT AND TRADEMARK OFFICE
CERTIFICATE OF CORRECTION

Page 1 of 1

PATENT NO. : 10,423,708 B2
APPLICATION NO. : 15/461717
DATED : September 24, 2019
INVENTOR(S) : Russell T. Davis and Luther Pearson Hampton It is certified that error appears in the above-identified patent and that said Letters Patent is hereby corrected as shown below:

In the Claims

In Claim 1, Column 81, Line 2, replace "non-statutory" with -- non-transitory --;
In Claim 2, Column 81, Line 62, replace "non-statutory" with -- non-transitory --;
In Claim 3, Column 82, Line 4, replace "non-statutory" with -- non-transitory --;
In Claim 4, Column 82, Line 11, replace "non-statutory" with -- non-transitory --;
In Claim 5, Column 82, Line 20, replace "non-statutory" with -- non-transitory --;
In Claim 6, Column 82, Line 28, replace "non-statutory" with -- non-transitory --;
In Claim 7, Column 82, Line 35, replace "non-statutory" with -- non-transitory --;
In Claim 8, Column 82, Line 43, replace "non-statutory" with -- non-transitory --;
In Claim 9, Column 82, Line 48, replace "non-statutory" with -- non-transitory --.

Signed and Sealed this
Twenty-fourth Day of December, 2019

Andrei Iancu
*Director of the United States Patent and Trademark Office*